(12) United States Patent
Blanchard

(10) Patent No.: US 12,222,123 B2
(45) Date of Patent: Feb. 11, 2025

(54) VENTILATION SYSTEM WITH AUTOMATIC FLOW BALANCING DERIVED FROM A NEURAL NETWORK AND METHODS OF USE

(71) Applicant: Broan-NuTone LLC, Hartford, WI (US)

(72) Inventor: Simon Blanchard, Drummondville (CA)

(73) Assignee: Broan-NuTone LLC, Hartford, WI (US)

( * ) Notice: Subject to any disclaimer, the term of this patent is extended or adjusted under 35 U.S.C. 154(b) by 0 days.

(21) Appl. No.: 18/322,063

(22) Filed: May 23, 2023

(65) Prior Publication Data

US 2023/0296279 A1    Sep. 21, 2023

Related U.S. Application Data

(63) Continuation of application No. 17/499,969, filed on Oct. 13, 2021, now Pat. No. 11,703,247, which is a
(Continued)

(51) Int. Cl.
*F24F 11/63*    (2018.01)
*F24F 11/00*    (2018.01)
(Continued)

(52) U.S. Cl.
CPC .......... *F24F 11/63* (2018.01); *F24F 11/0001* (2013.01); *F24F 11/77* (2018.01); *F24F 12/001* (2013.01)

(58) Field of Classification Search
CPC ........ F24F 11/00; F24F 11/0001; F24F 11/49; F24F 11/64; F24F 11/74; F24F 11/77; F24F 12/001; F24F 2110/30
(Continued)

(56) References Cited

U.S. PATENT DOCUMENTS 5,348,077 A     9/1994  Hillman
11,168,916 B2 * 11/2021  Blanchard ................ F24F 11/77
(Continued)

FOREIGN PATENT DOCUMENTS

CN     101842553     9/2010
CN     101140450     2/2011
(Continued)

OTHER PUBLICATIONS

Chinese Application No. 201980052973.0, Office Action mailed Jan. 12, 2022 (6 pages).
(Continued)

*Primary Examiner* — Ko-Wei Lin
(74) *Attorney, Agent, or Firm* — Barnes & Thornburg LLP

(57) ABSTRACT

A ventilation system with automatic flow balancing derived from a neural network to consistently achieve a desired flow rate for inlet flow and/or outlet flow in various operating environments to optimize system performance. The system includes a ventilation device that includes an exhaust blower assembly with a blower motor and a control circuit having a mathematical equation that determines an estimated exhaust blower flow based upon select inputs. The ventilation device also includes a supply blower assembly with a blower motor and control circuit having a mathematical equation that determines an estimated supply blower flow based upon select inputs. When the estimated exhaust blower flow is different than an exhaust flow set point, the exhaust control circuit selectively alters power supplied to the exhaust motor. When the estimated supply blower flow is different than a supply flow set point, the supply control circuit selectively alters power supplied to the supply motor.

22 Claims, 32 Drawing Sheets

Related U.S. Application Data continuation of application No. 16/438,066, filed on Jun. 11, 2019, now Pat. No. 11,168,916.

(60) Provisional application No. 62/683,420, filed on Jun. 11, 2018.

(51) Int. Cl.
  *F24F 11/77* (2018.01)
  *F24F 12/00* (2006.01)

(58) Field of Classification Search
  USPC .......................................................... 454/239
  See application file for complete search history.

(56) References Cited

U.S. PATENT DOCUMENTS

| | | | | |
|---|---|---|---|---|
| 11,703,247 | B2* | 7/2023 | Blanchard | F24F 11/0001 454/239 |
| 2003/0160104 | A1 | 9/2003 | Kelly et al. | |
| 2013/0073080 | A1* | 3/2013 | Ponulak | B25J 9/1635 700/246 |
| 2015/0219382 | A1 | 8/2015 | Uselton | |
| 2019/0309978 | A1* | 10/2019 | Song | F24F 11/58 |

FOREIGN PATENT DOCUMENTS

| | | |
|---|---|---|
| CN | 1982797 | 9/2011 |
| CN | 101354174 | 7/2012 |
| CN | 102353119 | 4/2013 |
| CN | 107390646 | 11/2017 |
| CN | 105318476 | 5/2018 |
| CN | 105588274 | 9/2018 |
| CN | 106779071 | 5/2019 |
| EP | 3203330 | 11/2018 |
| JP | 2002130777 | 8/2006 |
| KR | 101261199 | 5/2013 |
| WO | 2019241272 | 12/2019 |

OTHER PUBLICATIONS

Chinese Application No. 201980052973.0, Office Action mailed Jul. 25, 2022 (6 pages).

International Search Report and Written Opinion issued to PCT/US2019/036582, mailed Oct. 30, 2019 (11 pages).

Canadian Application No. 3,103,244, Office Action mailed Aug. 31, 2023 (4 pages).

* cited by examiner

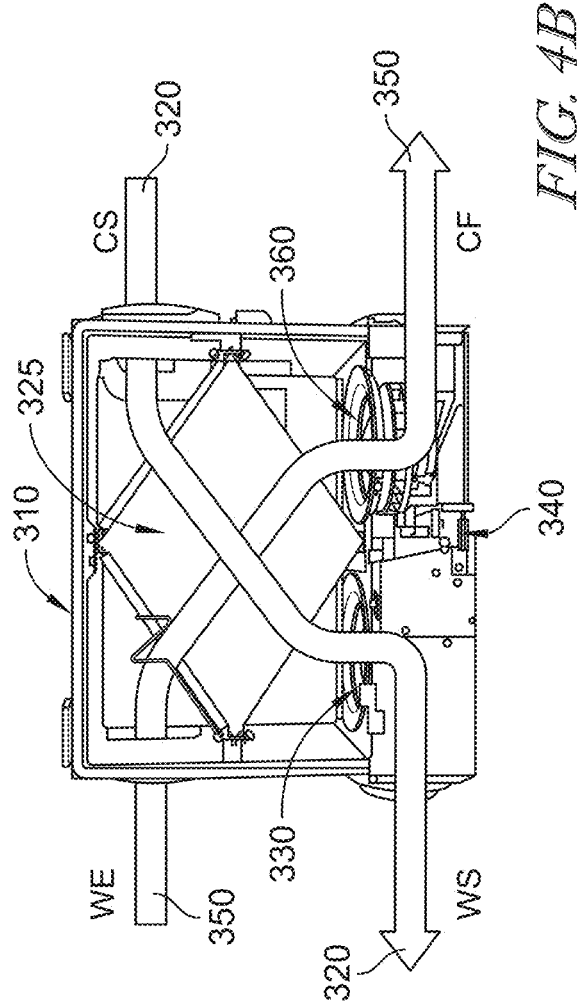

VENTILATION SYSTEM WITH AUTOMATIC FLOW BALANCING DERIVED FROM A NEURAL NETWORK AND METHODS OF USE

CROSS-REFERENCE TO RELATED APPLICATIONS

This Application is a continuation of U.S. application Ser. No. 17/499,969, which is a continuation of U.S. application Ser. No. 16/438,066, which claims the benefit of U.S. Provisional Patent Application No. 62/683,420, each of which are incorporated in their entirety herein by reference and made a part hereof.

FIELD OF DISCLOSURE

The present invention relates to a ventilation system, including a ventilation device, such as an air exchanger, with automatic flow balancing derived from a neural network to consistently achieve a desired flow rate for inlet flow and/or outlet flow in a variety of operating environments to optimize system performance.

BACKGROUND

FIG. 1A illustrates a partial cut-away view of a first operating environment 105 that contains an exemplary ventilation system 100 having an air exchanger 110 but that lacks an automatic flow balancing system. While the operating environment 105 shown in FIG. 1A is a house, the ventilation system 100 and air exchanger 110 may be installed in any building or structure including, but not limited to residential units, office buildings, factories, storage units, etc., to enable movement of air (gas, fumes, airborne particulate matter, or etc.). In particular, the air exchanger 110 may be a heat recovery ventilator ("HRV") or energy recovery ventilator ("ERV"). An HRV or ERV 110 moves air from a first space (e.g., outside the building) 115 to a second space (e.g., inside the building) 145 along a supply flow path 120. For example, the HRV or ERV 110 unit moves air along the following path: (i) from the first space 115 into a supply duct 122, (ii) the center 125 of the I-IRV or ERV 110, (iii) through the supply blower 130, (iv) into the supply ducting in the operating environment 135, and (v) out of the supply vents in the operating environment 140 to the second space 145. Additionally, the HRV or ERV 110 moves air from a second space (e.g., inside the building) 145 to a first space (e.g., outside the building) 115 along an exhaust flow path 150. For example, the HRV or ERV 110 moves air along the following path: (i) from the second space 145 into an exhaust ducting in the operating environment 155, (ii) the center 125 of the HRV or ERV 110, (iii) through the exhaust blower 160, (iv) into the exhaust duct 162, and (v) out of the exhaust vents in the operating environment 165 to the first space 115.

Ventilation systems 100 can have various configurations depending on the operating environment and the requirements of the system. For example, FIG. 1B illustrates a partial cut-away view of a second operating environment 105a that contains an exemplary ventilation system 100a having both an air exchanger 110a and an air handler or HVAC unit 170a, but the ventilation system 100a lacks an automatic flow balancing system. In contrast with the operating environment 105a shown in FIG. 1A, an air handler or HVAC unit 170a is positioned between the supply ducting in the operating environment 135a and the supply vents in the operating environment 140a. The differences between the operating environments 105a shown in FIGS. 1A-1B illustrate that the operating environment may require different duct lengths, transitions, and/or flow path obstructions (e.g., filters or air handlers). These differences in installations create different air path restrictions, namely different restrictions on the supply flow path 120a and the exhaust flow path 150a. Accordingly, the installer of the air exchanger 110a must try to manually adjust the system to account for these differences.

In an attempt to account for the differences between the different installations, a complex and time consuming process, which is shown and described in FIGS. 2A-2B, is undertaken by the installer. Specifically, in STEP 200, the installer will seal all the ductwork (e.g., see FIGS. 1A-1B at 155, 155a, 135, 135a) within the house with tape and close all windows and doors. In STEP 205, the installer will turn off all exhaust devices (e.g., range hood, dryer, and bathroom fan) 250, 250a. Next, in STEP 210, the installer will ensure that the balancing dampers located on the inlet ports (e.g., WE and CS) to the air exchanger 110, 110a are fully open. In STEP 215, the installer will set the air exchanger 110, 110a to its highest speed. Next, in STEP 220, the installer places the pressure gauges 255 on a level surface and adjust the gauges to zero. In STEP 225, the installer connects the pressure gauges 255 to the air exchanger 110, as shown in FIG. 2A. Next, in STEP 230, the installer determines the pressure value associated with the selected CFM value for the specific installation from the balancing chart provided with the air exchanger 110, 110a. In STEP 235, the installer adjusts the balancing dampers located on the inlet ports (e.g., WE and CS) until the values displayed on the pressure gauges 255 substantially match the values associated with the selected CFM value. This process may need to be repeated multiple times before the air exchanger 110, 110a is successfully balanced. Additionally, even if the air exchanger 110, 110a is properly balanced at one point, the air exchanger 110, 110a may become unbalanced due to changes in outside air density (e.g., changes in air temperature during the summer and winter), between cleaning or replacement of the air filters, or high wind speed in high rise towers.

An unbalanced air exchanger 110, 110a not only will have a degraded performance, but it will also cause multiple other problems depending on how the air exchanger 110, 110a is unbalanced. For example, if the air exchanger 110, 110a is unbalanced in a manner that creates positive air pressure in the operating environment 105, as shown in FIG. 3A, the air exchanger 110, 110a will push hot and/or humid air into the walls and/or insulation. This, in turn, can lead to mold, mildew, and/or rot forming in the walls. Additionally, this leads to heat loss within the operating environment 105, 105a. Alternatively, if the air exchanger 110, 110a is unbalanced in a manner that creates negative air pressure in the operating environment 105, as shown in FIG. 3B, the air exchanger 110, 110a will force unconditioned air within the operating environment 105, 105a. This, in turn, can lead to mold forming in the walls and will increase energy costs. Further, this may create backdrafts from combustion applications. To avoid these multiple problems, the air exchanger 110, 110a should be properly balanced within the operating environment 105, 105a. Moreover, an unbalanced air exchanger 110, 110a may not meet the building codes.

Accordingly, an air exchanger that overcomes the above issues is described herein. Specifically, the ventilation device 310 described herein automatically balances. Additionally, the ventilation device 310 has the ability to rebalance itself in light of temperature changes or other like factors. Further, an ventilation device 310 that can automatically balance itself within 10% error. Such an ventilation device 310 will save the installer from performing all the STEPS described in FIG. 2A at various points, including at installation and when the seasons change. In addition, such an ventilation device 310 will meet various building codes (see e.g., Canada's National building codes, including 9.32.3.4-9.32.3.5, and CAN/CSA-F326-M91), including stricter local codes that have been or may be adopted in the future (e.g., State of California).

The description provided in the background section should not be assumed to be prior art merely because it is mentioned in or associated with the background section. The background section may include information that describes one or more aspects of the subject technology.

SUMMARY

The present disclosure relates to a ventilation system, including a ventilation device, such as an air exchanger, with automatic flow balancing derived from a neural network to consistently achieve a desired flow rate for inlet flow and/or outlet flow in a variety of operating environments to optimize system performance.

According to an aspect of the present disclosure, the present invention provides a ventilation system with automatic flow balancing derived from a neural network for installation in a ventilation environment. The ventilation system includes ventilation device lacking a pressure sensor, but includes a first blower assembly including a blower motor and a control circuit, said control circuit having a first mathematical equation. The first mathematical equation that is contained within the first blower assembly determines an estimated blower air flow for the first blower assembly based upon the following inputs: (i) exhaust air path parameters derived from the use of a neural network, (ii) blower motor speed, and (iii) blower motor current. The ventilation system then determines if the blower air flow is different than an air flow set point determined by a user of the system, the control circuit being configured to selectively alter power supplied to the blower motor in order to make the estimated blower air flow equal to the air flow set point.

According to an aspect of the present disclosure, the present invention provides a ventilation system with automatic flow balancing derived from a neural network for installation in a ventilation environment. The ventilation system includes ventilation device lacking a pressure sensor, but includes a supply blower assembly including a supply blower motor and a supply control circuit, said supply control circuit having a supply mathematical equation. The ventilation system also includes an exhaust blower assembly including an exhaust blower motor and an exhaust control circuit, said exhaust control circuit having an exhaust mathematical equation. The supply mathematical equation that is contained within the supply blower assembly determines an estimated supply blower air flow for the supply blower assembly based upon the following inputs: (i) supply air path parameters derived from the use of a neural network, (ii) supply blower motor speed, and (iii) supply blower motor current. The exhaust mathematical equation that is contained within the exhaust blower assembly determines an estimated exhaust blower air flow for the exhaust blower assembly based upon the following inputs: (i) exhaust air path parameters derived from the use of a neural network, (ii) exhaust blower motor speed, and (iii) exhaust blower motor current. The ventilation system then determines if the supply blower air flow is different than an supply air flow set point determined by a user of the system, the supply control circuit being configured to selectively alter power supplied to the supply blower motor in order to make the estimated supply blower air flow equal to the supply air flow set point. And finally, the ventilation system then determines if the exhaust blower air flow is different than an exhaust air flow set point determined by a user of the system, the exhaust control circuit being configured to selectively alter power supplied to the exhaust blower motor in order to make the estimated exhaust blower air flow equal to the exhaust air flow set point.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4B is a perspective view showing components of the ventilation device of the system FIG. 4A;

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Further, modules and processes depicted may be combined, in whole or in part, and/or divided, into one or more different parts, as applicable to fit particular implementations without departing from the scope of the present disclosure. Moreover, disclosure of structures, functions, operations, components from one embodiment may be utilized in connection with or may replace structures, functions, operations, components contained within a different embodiment. Accordingly, the drawings and description are to be regarded as illustrative in nature and not restrictive.

Figure 4A:
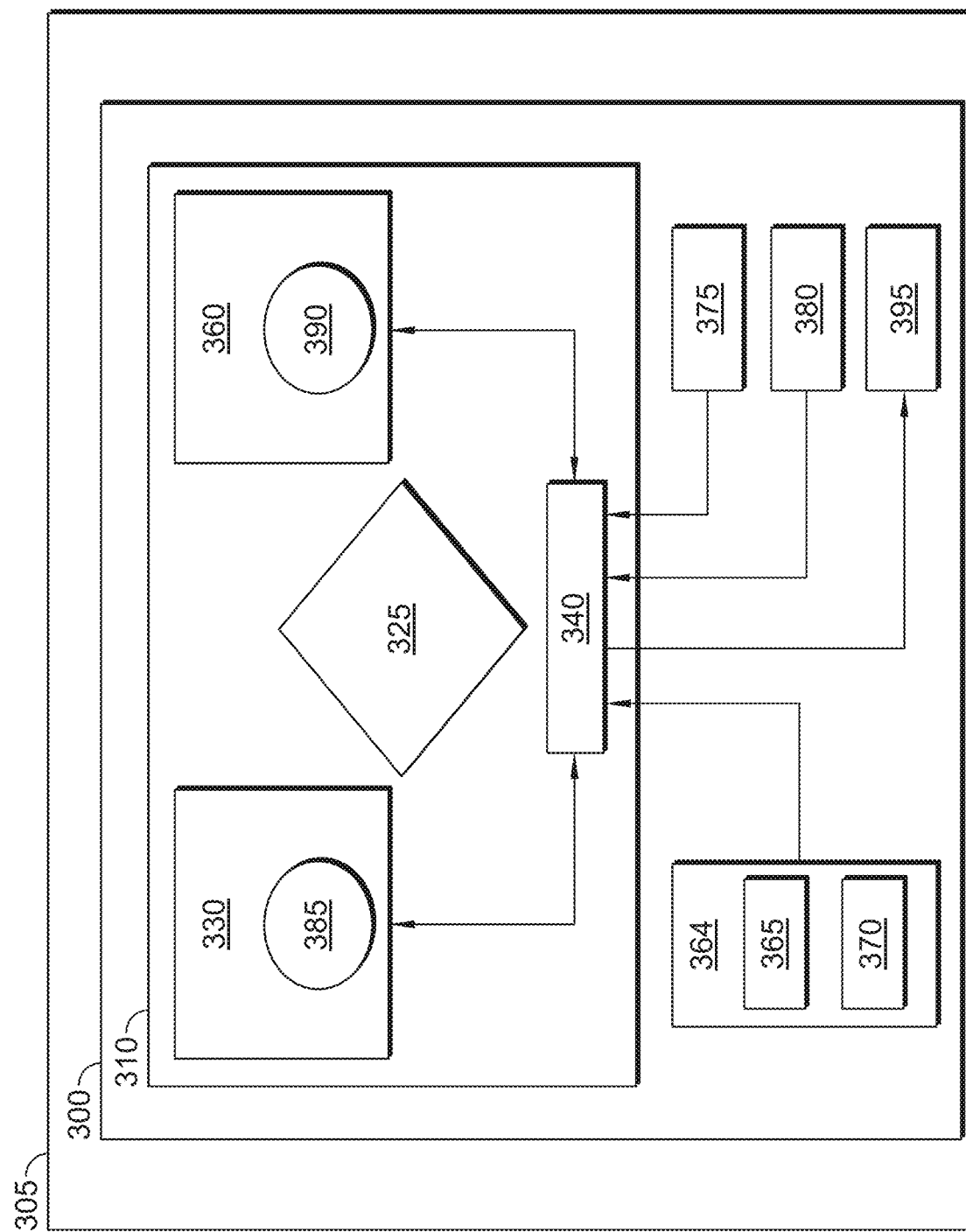
FIG. 4A is a block diagram illustrating a first exemplary embodiment of a ventilation system in an operating environment.

FIG. 4A is a block diagram illustrating a first exemplary embodiment of a ventilation system 300 installed an operating environment 305. FIG. 4B shows components of a ventilation device 310 of the system 300. The ventilation device 310, may be an HRV or ERV, is designed to move air from one location to another location within the operating environment 305. The system 300, including the ventilation device 310, can be installed in a variety of environments 305, such as buildings or structures including houses, single family or multi-family residential units, office buildings, factories, manufacturing facilities, etc. Accordingly, the system 300 includes: (i) the ventilation device 310, (ii) a supply flow path 320, which allows air to move from the first space (e.g., outside the environment 305) to the second space (e.g., inside the environment 305), (iii) an exhaust flow path 350, which allows air to move from the second space (e.g., inside the environment 305) to the first space (e.g., outside the environment 305), and (iv) optional components, such as temperature sensor 375, relative humidity 380, and motorized damper 395.

Figures 1A, 1B:
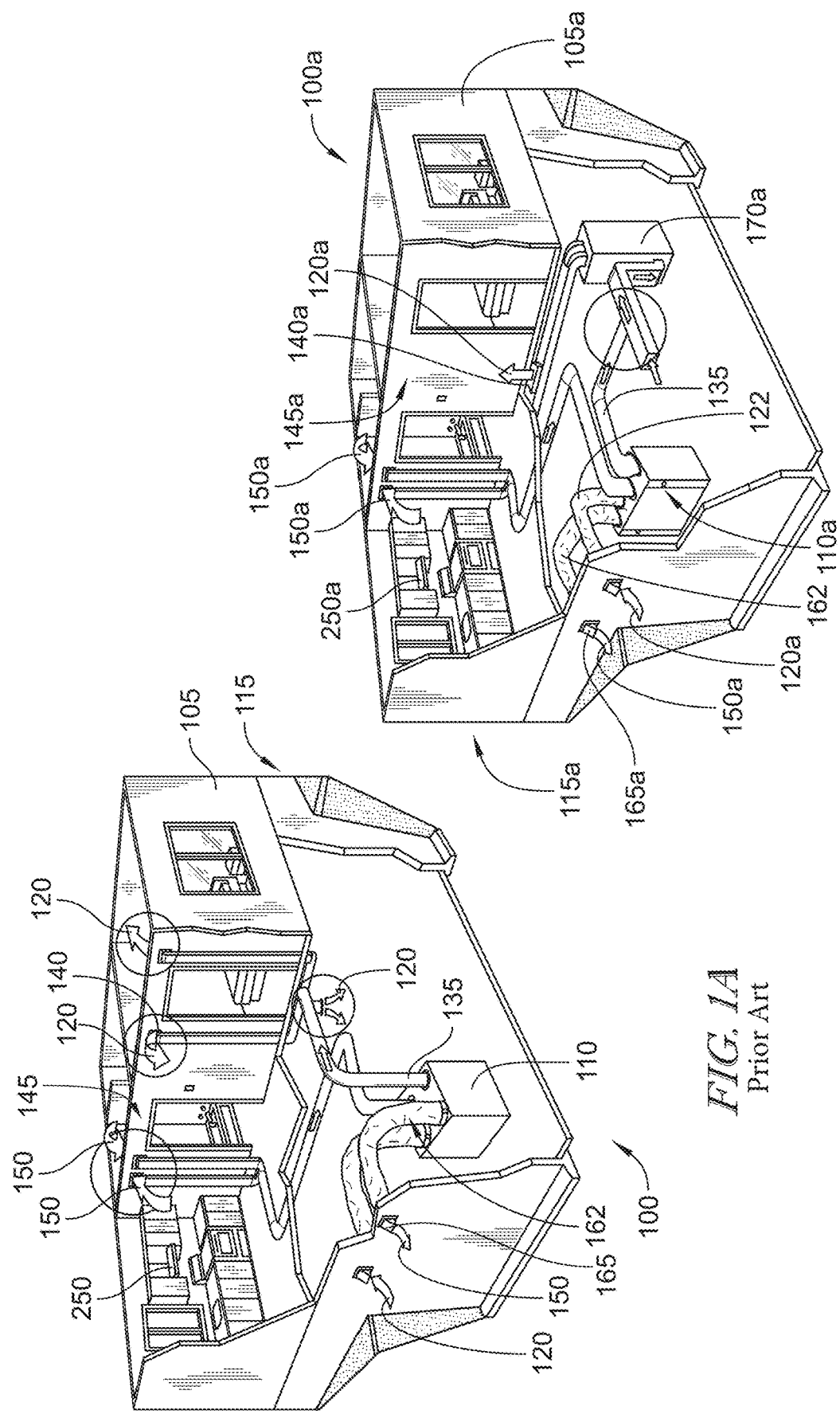
FIG. 1A is a partially cut-away view of a first exemplary ventilation system containing the air exchanger unit.
FIG. 1B is a partially cut-away view of a second exemplary ventilation system containing the air exchanger unit.
Figure 2A:
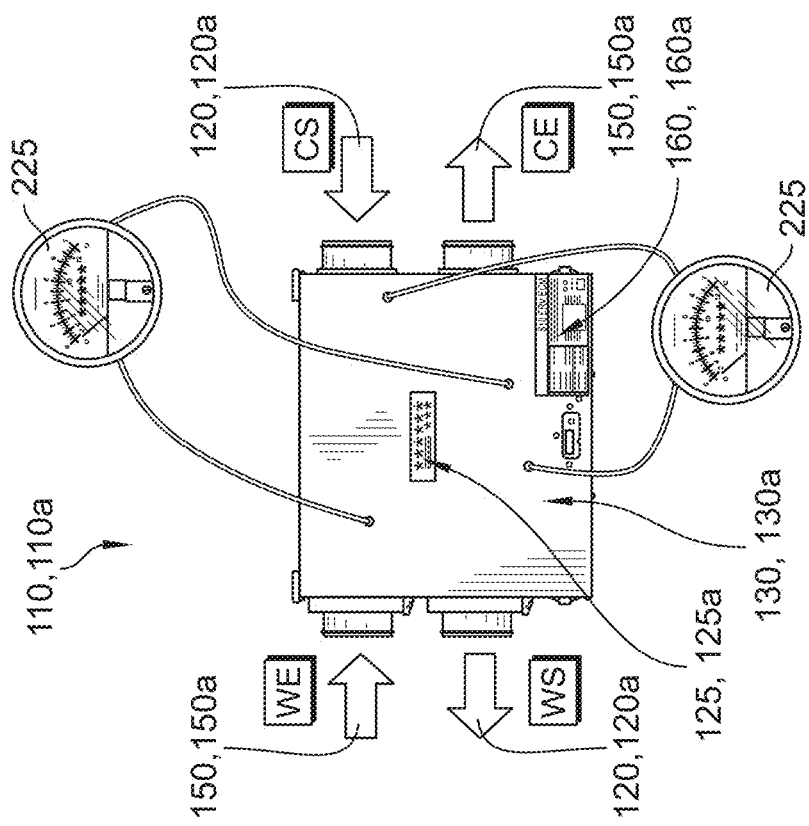
FIG. 2A is the air exchanger unit undergoing a manual balancing procedure.

The ventilation device 310 is designed to replace the air exchanger 110 shown in FIGS. 1A-1B. The ventilation device 310 includes a supply blower 330 and an exhaust blower 360, which are controlled by a control circuit 340. While both blowers 330, 360 may be permanent magnet synchronous motor (PMSM) or a brushless AC (BLAC), it should be understood that different types of blowers 330, 360 may be used, such as a brushless DC motor (BLDC). The ventilation device 310 does not include a flow or pressure sensor within the core 325 or within the adjacent air paths 320, 350 for measuring and adjusting the blowers 330, 360. Not utilizing a flow or pressure sensor reduces the cost of the ventilation device 310 and increases reliability due to the fact that this failure point is eliminated. Instead, the ventilation device 310 uses the control circuit 340 in connection with a mathematical solution 500a, 500b to automatically balance the supply and exhaust air flow paths in real time. For example, the ventilation device 310 may include a supply flow estimator 455a that includes a mathematical equation 500a that utilizes supply air path parameters 415 that are derived from a neural network that is trained using a supply blower map. Likewise, the ventilation device 310 may include an exhaust flow estimator 455b that includes a mathematical equation 500b that utilizes supply air path parameters 425 that are derived from a neural network that is trained using an exhaust blower map. The mathematical solutions 500a, 500b may be varied based upon the complexity ventilation device 310, its desired operating parameters, and ambient conditions which are understood to vary due to seasonal changes. Accordingly, the ventilation device 310 does not have to be manually balanced, as discussed in FIGS. 2A-2B, which provides significant cost savings and improved efficiencies to the system 300. Additionally and as discussed in greater detail below, the mathematical solution 500a, 500b derived from the use of a neural network and that is implemented within the control circuit 340 of the ventilation device 310 provides close to a tenfold (10x) improvement over the use of certain polynomial equations used in conventional air exchangers 110. The system's 300 use of the mathematical solution 500a, 500b derived from a neural network consistently achieves a desired flow rate for inlet flow and/or outlet flow in a variety of operating environments to optimize system performance. The use of the mathematical solution 500a, 500*b* derived from a neural network in the ventilation device 310 solves the significant inability of conventional air exchangers 110 using polynomial equations to meet building code requirements that are being implemented globally.

Figure 5A:
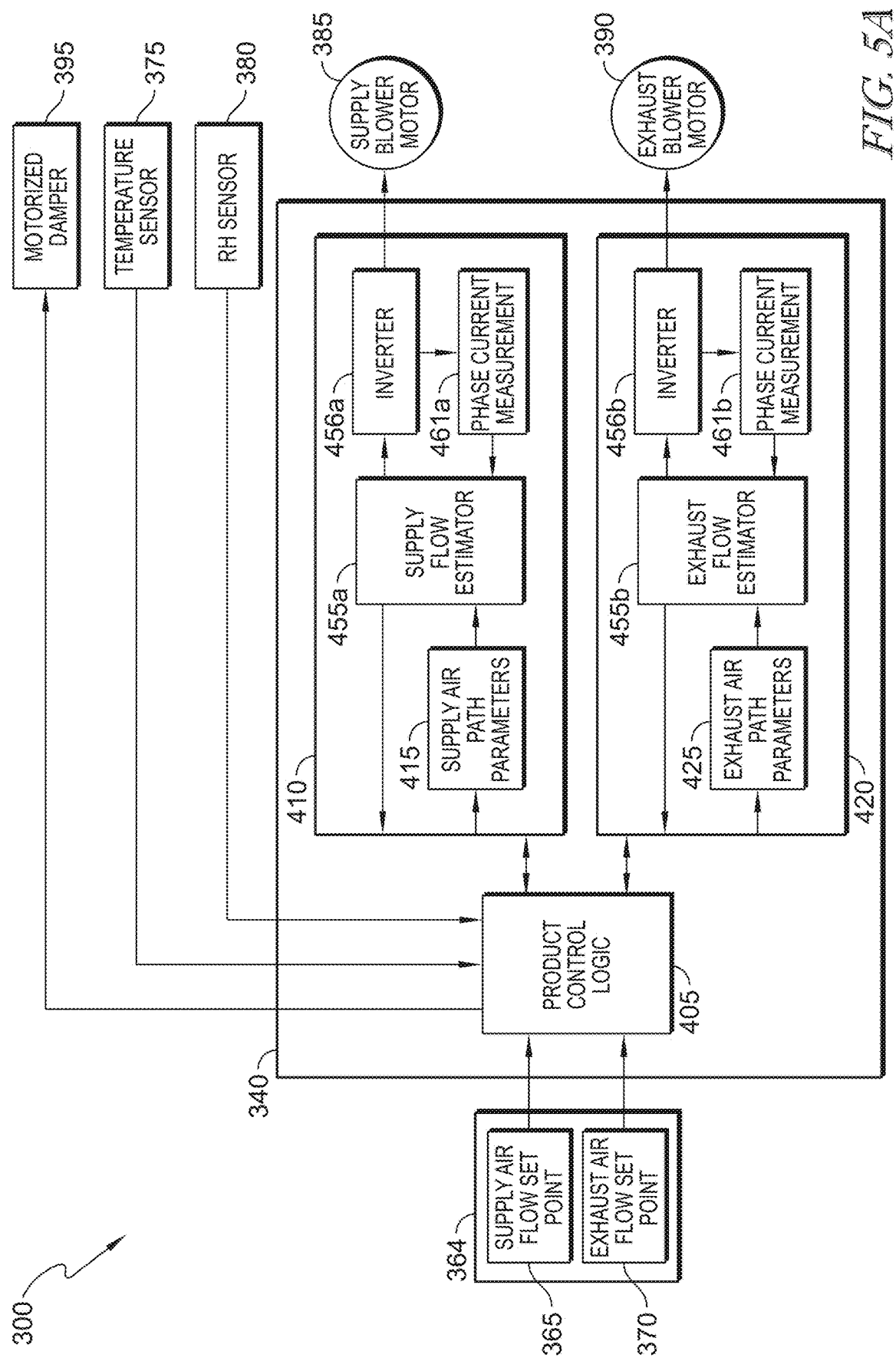
FIGS. 5A-5C are block diagrams of the control circuit for the ventilation device unit shown in FIG. 4.
Figure 5B:
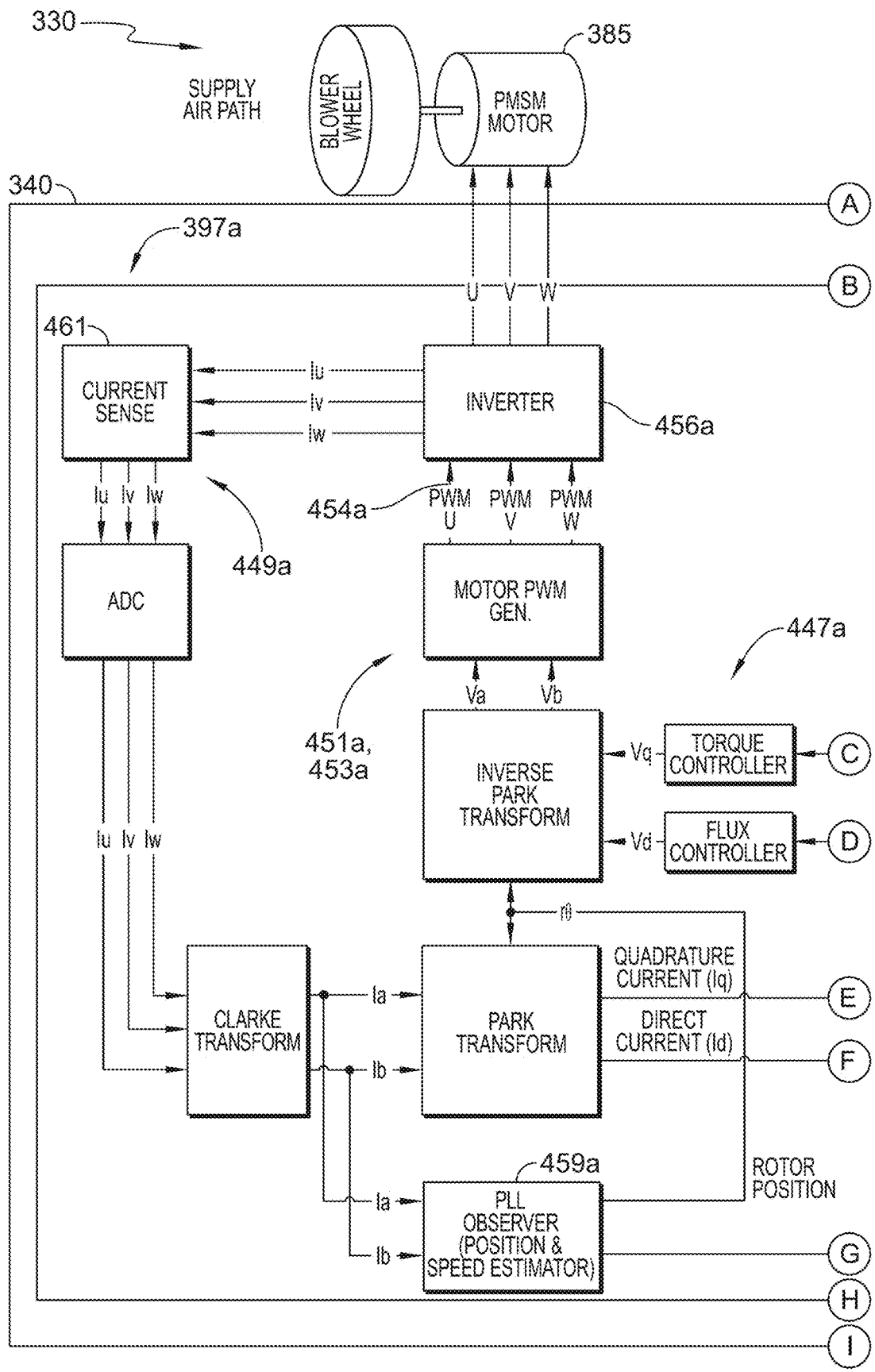
Figure 5B:
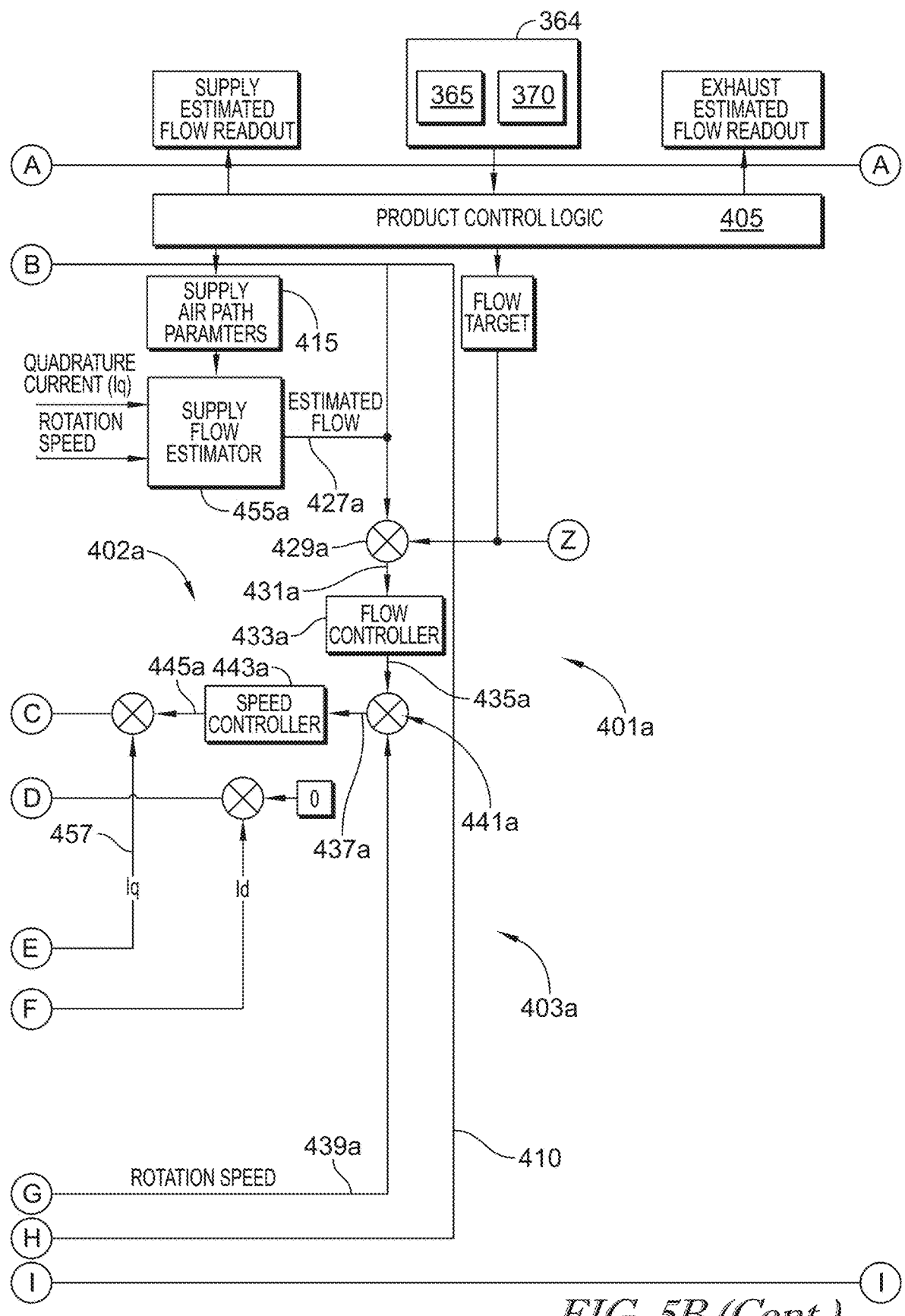
Figure 5C:
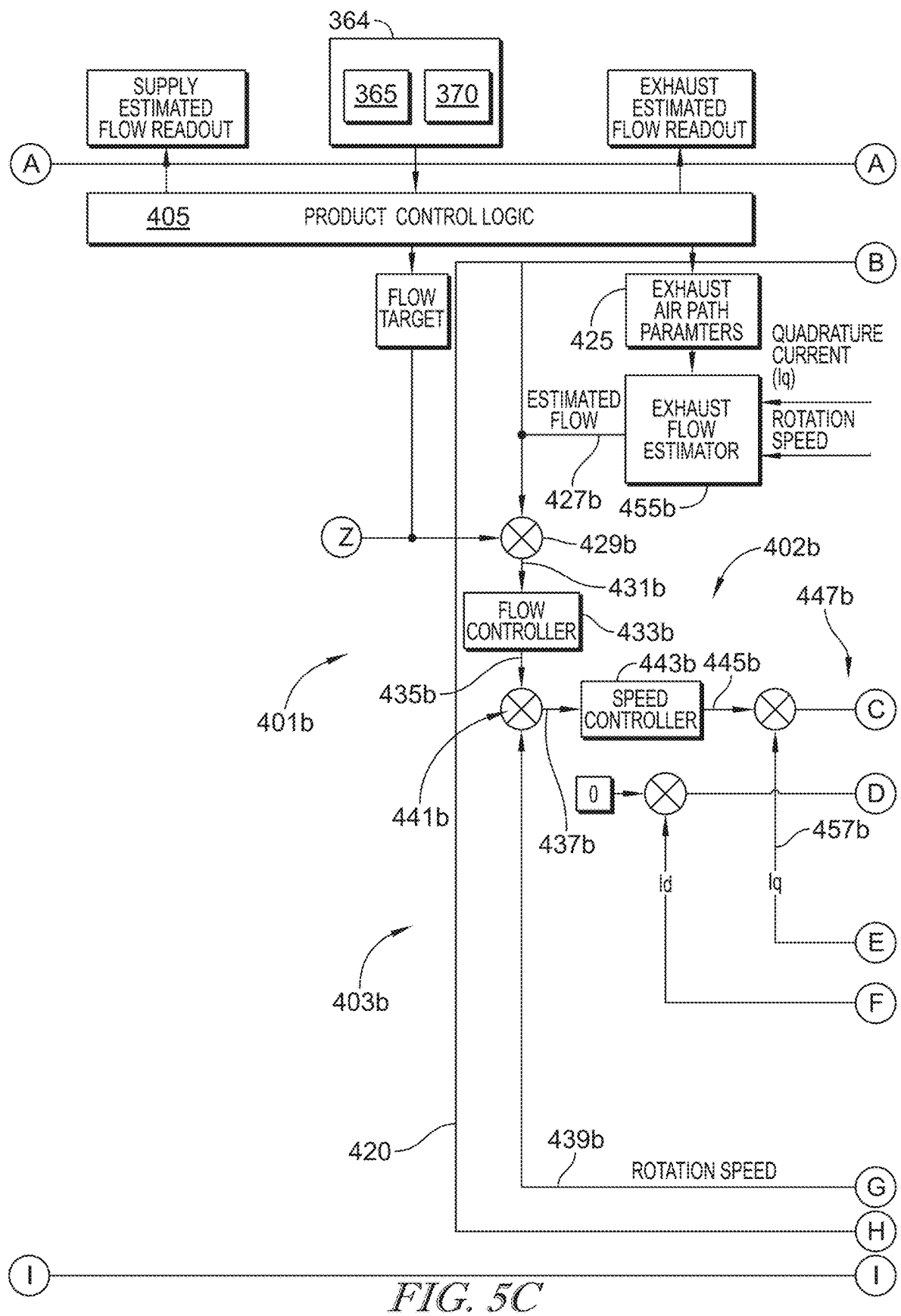
Figure 5C:
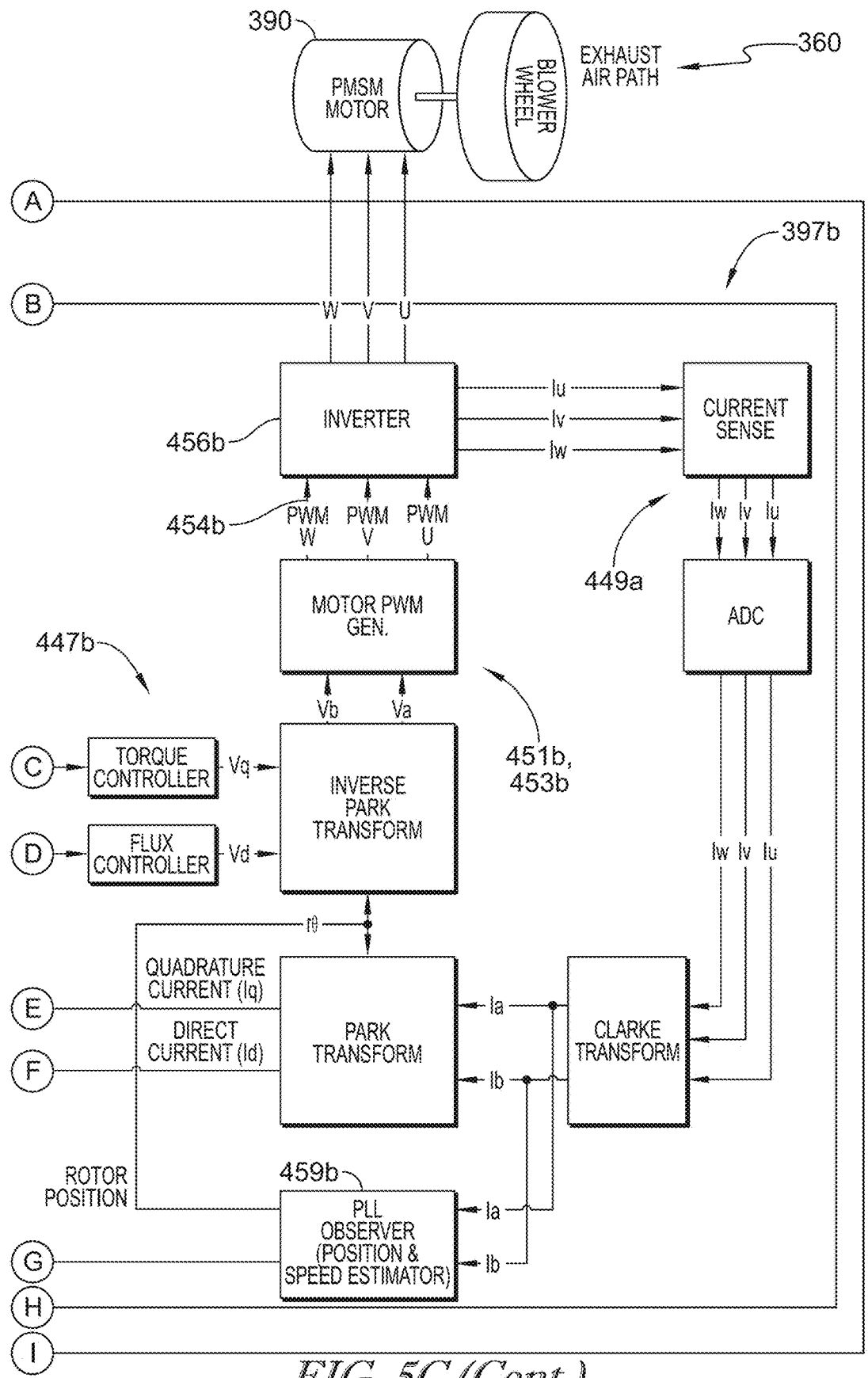
Figure 6A:
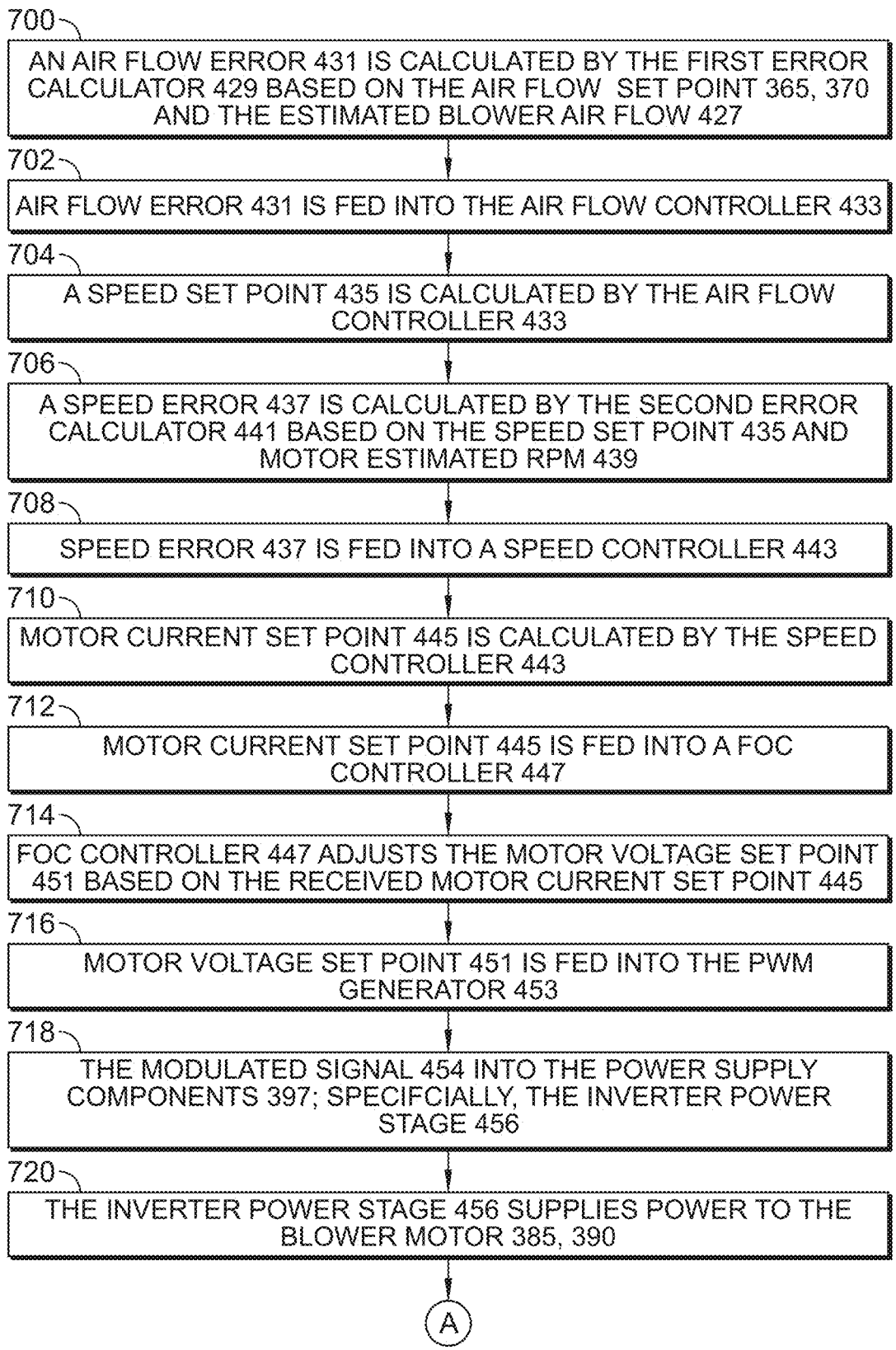
FIGS. 6A-6B are exemplary flowcharts showing the operation of the flow controller.
Figure 6B:
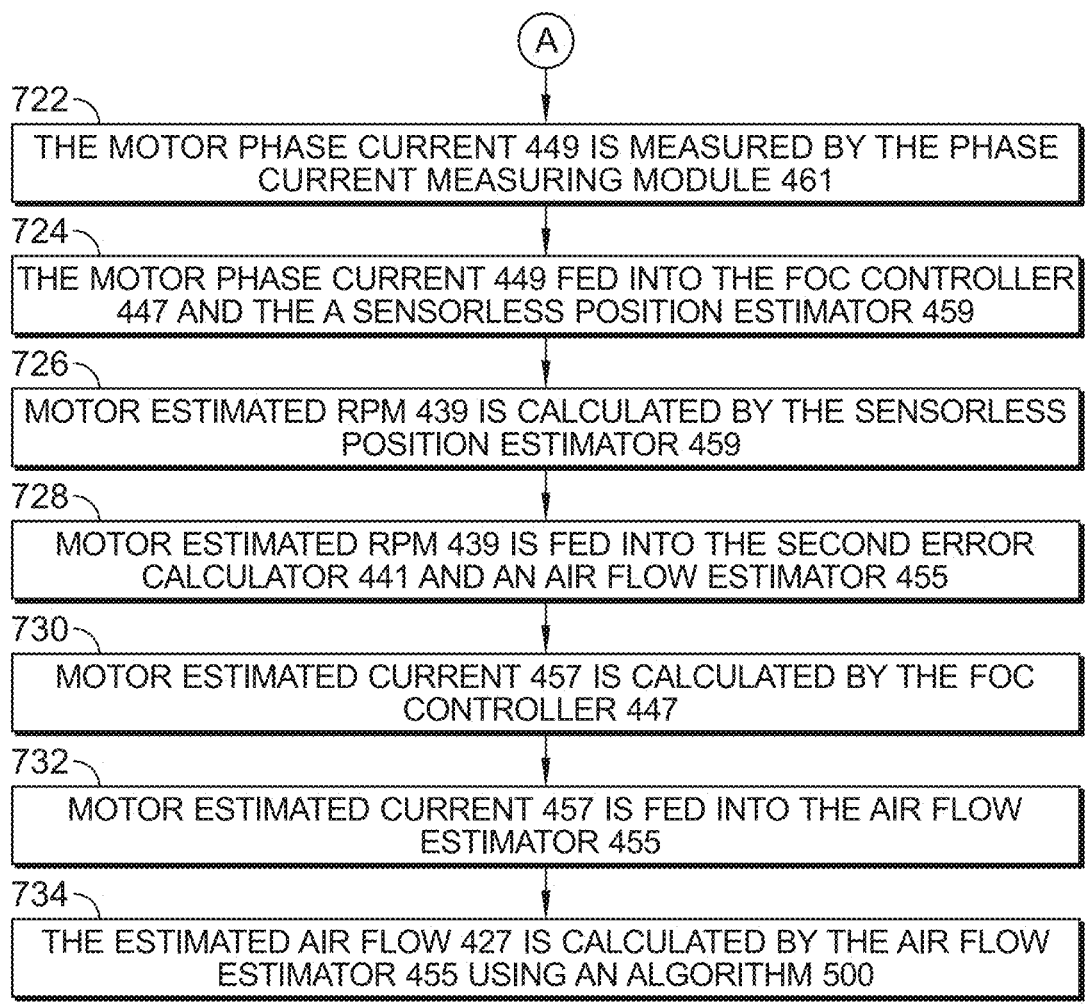
Figure 7:
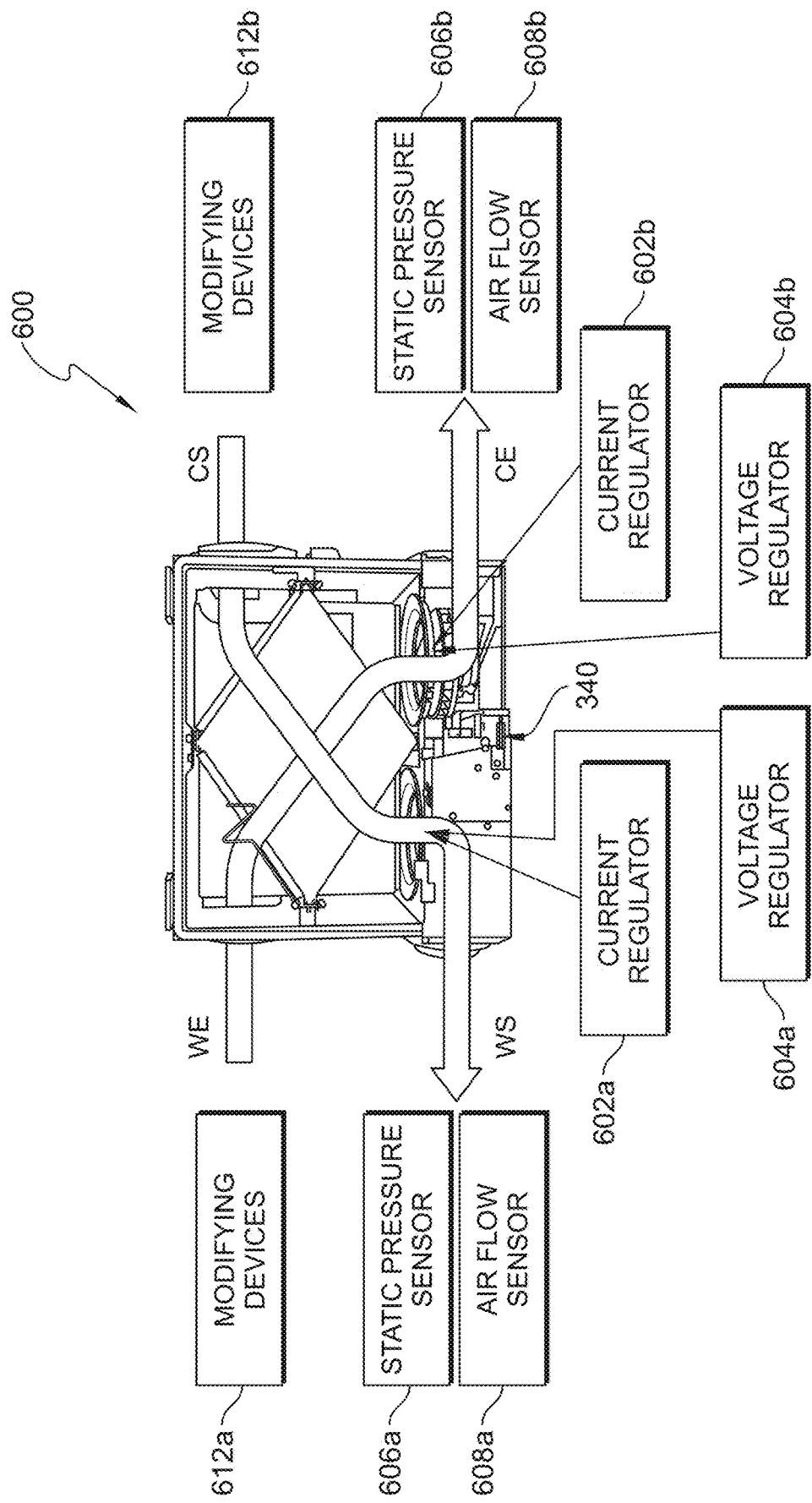
FIG. 7 is an exemplary test setup for measuring parameters that are associated with the ventilation device shown in FIG. 4.

FIGS. 5A-5C are circuit diagram of the control circuit 340 for the ventilation device 310, shown in FIG. 4. The control circuit 340 receives input signals from a supply air flow set point 365, an exhaust air flow set point 370, an optional temperature sensor 375, and an optional relative humidity 380. The combination of the supply air flow set point 365 and an exhaust air flow set point 370 is a user defined air flow set point 364, which is set at a second location, such as a house, apartment, or office. The user may set the user defined air flow set point 364 using a controller to select the desired CFM output of the system 300 into the environment 305. It should be understood that the supply air flow set point 365 may be different than the exhaust air flow point 370 for the user defined air flow set point 364. The controller may be: (i) a wall controller that is coupled to the ventilation device 310 using a wire, (ii) a wall controller that is coupled to the ventilation device 310 using a wireless connection (e.g., Bluetooth, Wi-Fi), (iii) a mobile device that is wirelessly coupled to the ventilation device 310, or (iv) a combination of any of these controllers. For example, the user may set the user defined air flow set point 364 to a value between 40 CFM to 300 CFM depending on the operating environment 305. The control circuit 340 also send output signals to: (i) a supply blower motor 385, which is a part of the supply blower 330, and (ii) an exhaust blower motor 390, which is a part of the exhaust blower 360. Optionally, the control circuit 340 can also send output signals to a motorized damper 395, such as the damper disclosed within Ser. No. 16/242,498, filed on Jan. 9, 2019, and which is hereby incorporated by reference for all purposes. This damper may be used to increase the internal restriction of the ventilation device 310 to bring the pressure within the flow estimation operating limits.

The following description describes components contained within the control circuit 340. It should understood that the following components that have similar numbers that are only separated by "a" and "b" are components that are substantially similar. For example, a component that is located on the supply side of the ventilation device 310 will be denoted with an "a", while the same component that is located on the exhaust side of the ventilation device 310 will be denoted with a "b". The components containing control circuit 340 include: (i) product control logic board 405, (ii) supply flow controller 410 and (iii) exhaust flow controller 420. The supply flow controller 410 includes supply air path parameters 415, supply flow estimator 455*a*, inverter 456*a* and a phase current measurement component 461*a*. Like the supply flow controller 410, the exhaust flow controller 400 includes exhaust air path parameters 425*b*, exhaust flow estimator 455*b*, inverter 456*b* and a phase current measurement component 461*b*. The supply and exhaust flow controllers each include separate air path parameters 415, 425 and separate flow estimators 410, 420 to ensure that the blower motor 385, 390 can adjust the air flow through their respective flow path 320, 350 to account for differences (e.g., duct length, filters, or other obstructions) between the flow paths 320, 350. Such differences are shown and discussed in connection with FIGS. 1-1A. For example, the supply flow path 320 may be more restrictive than the exhaust flow path 350 because the supply flow path 320 may contain additional filters. Additionally, the supply flow path 320 and the exhaust flow path 350 may have different static pressures because of an air handler 170. Accordingly, each blower motor's controller 410, 420 accounts for these differences to ensure that the ventilation device 310 is balanced.

FIG. 5A-5C are circuit diagram containing components of the ventilation device 310, shown in FIG. 4, including supply flow controller 410 and exhaust flow controller 420. The supply and exhaust flow controller 410, 420 each contain approximately three cascading feedback loops that work together to regulate the air flow produced by the blower 330, 360. In particular, the feedback loops regulate the current that is supplied to the blower 330, 360, which in turn regulates the air flow produced by the blower 330, 360. Here, the regulation of the current supplied to the blower motor 385, 390 dictates the speed at which the blower motor 385, 390 turns the fan blades. Also, the regulation of the speed that the blower motor 385, 390 turns the fan blades dictates the air flow produced by the blower 330, 360. Therefore, the regulation of the current being supplied to the blower 330, 360 controls the air flow produced by the blower 330, 360. It should be understood, that the relationship between the current being supplied to the blower 330, 360 does not have a linear relationship to the air flow produced by the blower 330, 360. To try to account for this non-linear relationship. this disclosure discusses the utilization of a mathematical solution 500*a*, 500*b* derived from a neural network in order to determine the relationship between the current, motor rotation, and the air flow rate. Additionally, it should be understood that the non-linear relationship of the current in comparison with the air flow produced by the supply blower 330 may be different than the non-linear relationship of the current in comparison with the air flow produced by the exhaust blower 360. To account for these differences between the supply and exhaust paths, different mathematical solutions 500*a*, 500*b* are utilized for each air path. In particular, the supply side blower 330 will be controlled using the supply mathematical solution 500*a* and the exhaust side blower 360 will be controlled using the exhaust mathematical solution 500*b*.

The circuit diagrams shown in FIGS. 5A-5C operate in the following manner. The mathematical equation 500*a*, 500*b* determines an estimated blower air flow 427*a*, 427*b* for the blower assembly 330, 360 based upon the following inputs: (i) air path parameters 415, 425 derived from the use of a neural network, (ii) blower motor speed 439*a*, 439*b*, and (iii) blower motor current 457*a*, 457*b*. If an estimated air flow rate 427*a*, 427*b* (e.g., 90 CFM) is below a desired air flow set point 365, 370 (e.g., 100 CFM), then the flow controller 410, 420 increases the speed demand, which in turn will increase the current that is supplied to the blower motor 385, 390. The increase in current being supplied to the blower motor 385, 390 causes an increase in the speed of the blower motor 385, 390, which in turn increases the air flow produced by the blower 330, 360. The cascading feedback loops continue to work together to increase the current being supplied to blower motor 385, 390 until the blower motor's speed is fast enough to provide air flow at the desired flow set point (e.g., 100 CFM). It should be understood that an increase in the current being supplied to one of the blowers 330, 360 may require a similar increase, less of an increase, or more of an increase in the current being supplied to the other blower 330, 360 to account for the differences in the air flow paths 320, 350 and maintain balance between the air flows 320, 350.

Alternatively, if the estimated air flow rate 427*a*, 427*b* (e.g., 110 CFM) is above a desired air flow set point 365, 370 (e.g. 100 CFM), then the flow controller 410, 420 decreases the speed demand, which in turn decreases the current that is supplied to the blower motor 385, 390. The decrease in current being supplied to the blower motor 385, 390 causes a decrease in the speed of the blower motor 385, 390. This decrease in the speed of the blower motor 385, 390 results in a decrease in the air flow produced by the blower 330, 360. The cascading feedback loops continue to work together to decrease the current being supplied to the blower motor 385, 390 until the blower motor's speed is slow enough to provide air flow at the desired flow set point (e.g., 100 CFM). As described above, a decrease in the current being supplied to one of the blowers 330, 360 may require a similar decrease, less of a decrease, or more of a decrease in the current being supplied to the other blower 330, 360 to account for the differences in the air flow paths 320, 350. To protect the blower 330, 360 from major damage, the flow controller 410, 420 limits: (i) the amount of current that can be applied to the blower motor 385, 390 and (ii) the blower motor's 385, 390 RPMS. If the air flow set point requires the blower 330, 360 to operate outside of the current limits, the control circuit 340 will provide the user or installer with a warning that the desired air flow set point 415, 425 cannot be reached by the system.

Specifically, the functionality of the cascading feedback loops that are contained within each of the flow controller 410, 420 is described below. STEPS 700-734 describe the flow of the first feedback loop 401a, 401b, STEPS 706-728 describe the flow of the second feedback loop 402a, 402b, and STEPS 714-724 describe the flow of the third feedback loop 403a, 403b. In STEP 700, a first error calculator 429a, 429b determines an air flow error 431a, 431b based on the air flow set point 365, 370 and an estimated blower air flow 427a, 427b. In STEP 702, the resulting air flow error 431a, 431b is fed into an air flow controller 433a, 433b. In STEP 704, the air flow controller 433a, 433b uses a proportional integral derivative ("PID") or other optimized methods to compute the speed set point 435a, 435b. In STEP 706, a second error calculator 441a, 441b determines a speed error 437a, 437b based on the speed set point 435a, 435b and motor estimated revolutions per minute ("RPM") 439a, 439b. In STEP 708, the resulting speed error 437a, 437b is fed into a speed controller 443a, 443b. In STEP 710, the speed controller 443a, 443b uses a PID or other optimized methods to compute the motor current set point 445a, 445b. In STEP 712, the motor current set point 445a, 445b is feed into a field oriented control ("FOC") 447a, 447b. The FOC 447a, 447b is used to regulate the motor phase current 449a, 449b and may include two calculators inverse park transform component, a park transforth, Clarke transform, torque controller, and/or a flux controller. In STEPS 714 and 716, the FOC 447a, 447b regulates the motor phase current 449a, 4491) by adjusting the motor voltage set point 451a, 451b that is fed into the motor pulse-width modulation ("PWM") generator 453a, 453b based on the received motor current set point 445a, 445b. The PWM generator 453a, 453b may use: (i) a space vector modulation ("SVM") technique, or (ii) SPWM ("Sinusoidal PWM") technique, or (iii) other similar techniques to optimize the system performance and improve usage of the DC bus voltage. In STEP 718, the PWM generator 453a, 453b feeds the modulated signal 454a, 454b into the power supply components 397, 397a; specifically, the inverter power stage 456, 456a. In STEP 720, the inverter power stage 456a, 456b supplies power to the blower motor 385, 390.

In STEP 722, a phase current measuring module 461a, 461b measures and outputs the motor phase current 449a, 449). In STEP 724, the motor phase current 449a, 449b is then fed into the FOC controller 447a, 447b and a position estimator 459a, 459b. The FOC controller 447a, 447b utilizes the measured motor phase current 449a, 449b to determine what future adjustments to the motor voltage set point 451a, 451b are required to meet the desired air flow set point 365, 370. In STEP 726, the position estimator 459a, 459b uses the measured motor phase current 449a, 449b to compute the motor estimated RPM 439a, 439b. To compute the motor estimated RPM 439a, 439b, the position estimator 459a, 459b uses either: (i) a phase locked loop ("PLL") observer, (ii) a high frequency signal injection ("HFI") observer, (iii) Cordic observer, or (iv) a position sensor, or (v) other position observer relevant for the application.

In STEP 728, the motor estimated RPM 439a, 439b is fed into the second error calculator 441a, 441b and into an air flow estimator 455a, 455b. In STEP 730, the FOC controller 447a, 447b uses a Park and Clark transform to analyze the motor phase current 449a, 449b in order to determine the motor estimated current 457a, 457b. In STEP 732, the motor estimated current 457a, 457b is fed into the air flow estimator 455a, 455b. In STEP 734, the air flow estimator 455a, 455b calculates the estimated air flow 427a, 427b using the mathematical equation 500a, 500b. Specifically, the mathematical equation 500a, 500b uses: (i) the motor estimated RPM 439a, 439b, (ii) the motor estimated current 457a, 457b and (iii) air path parameters 415, 425 to compute the blower estimated air flow 427a. 427b. STEPS 700-734 are continually repeated while the blower 330, 360 is operating; this helps to ensure that the air flow remains at the air set point 365, 370. Specifically, STEPS 700-734 are preferably repeated at least every five seconds, more preferably every two seconds, and most preferably every half of a second.

The operation of the second feedback loop 402a, 402b is described below. The second error calculator 441a, 441b determines a speed error 437a, 437b based on the speed set point 435a, 435b and motor estimated RPM 439a, 439b. In STEP 708, the resulting speed error 437a, 437b is fed into a speed controller 443a, 443b. In STEP 710, the speed controller 443a, 443b uses a PID or other optimized methods to compute the motor current set point 445a, 445b. In STEP 712, the motor current set point 445a, 445b is fed into a FOC 447a, 447b. The FOC 447a, 447b is used to regulate the motor phase current 449a, 449b. In STEPS 714 and 716, the FOC 447a, 447b, regulates the motor phase current 449a, 449b by adjusting the motor voltage set point 451a, 451b that is fed into the motor PWM generator 453a, 453b based on the received motor current set point 445a, 445b. In STEP 718, the PWM generator 453a, 453b feeds the modulated signal 454a, 454b into the power supply components 397a, 397b; specifically, the inverter power stage 456a, 456b. In STEP 720, the inverter power stage 456a, 456b supplies power to the blower motor 385, 390. In STEP 722, a phase current measuring module 461a, 461b measures and outputs the motor phase current 449a, 449b. In STEP 724, the motor phase current 449a, 449b is then fed into the FOC controller 447a, 447b and a position estimator 459a, 459b. In STEP 726, the position estimator 459a, 459b uses the measured motor phase current 449a, 449b to compute the motor estimated RPM 439a, 439b. In STEP 728, the motor estimated RPM 439a, 439b is fed into the second error calculator 441a, 441b and into an air flow estimator 455a, 455b. STEPS 706-728 are continually repeated while the blower 330, 360 is operating; this helps to ensure that the air flow remains at the air set point 365, 370. Specifically, STEPS 706-728 are preferably repeated at least every half second, more preferably every quarter second, and most preferably every millisecond.

The operation of the third feedback loop 403a, 403b is described below. The FOC 447a, 447b is used to regulate the motor phase current 449a, 449b. In STEPS 714 and 716, the FOC 447a, 447b regulates the motor phase current 449a, 449b by adjusting the motor voltage set point 451a, 451b that is fed into the motor PWM generator 453a, 453b based on the received motor current set point 445a, 445b. In STEP 718, the PWM generator 453a, 453b feeds the modulated signal 454a, 454b into the power supply components 397a, 397b; specifically, the inverter power stage 456a, 456b. In STEP 720, the inverter power stage 456,a 456b supplies power to the blower motor 385, 390. In STEP 722, a phase current measuring module 461a, 461b measures and outputs the motor phase current 449a, 449b. In STEP 724, the motor phase current 449a, 449b is then fed into the FOC controller 447a, 447b and a position estimator 459a, 459b. STEPS 714-724 are continually repeated while the blower 330, 360 is operating; this helps to ensure that the air flow remains at the air set point 365, 370. Specifically, STEPS 714-724 are preferably repeated at least every microsecond, more preferably every quarter microsecond, and most preferably every millisecond. In other words, STEPS 714-724 are performed typically between 4,000 to 16,000 time a sec.

Figure 13:
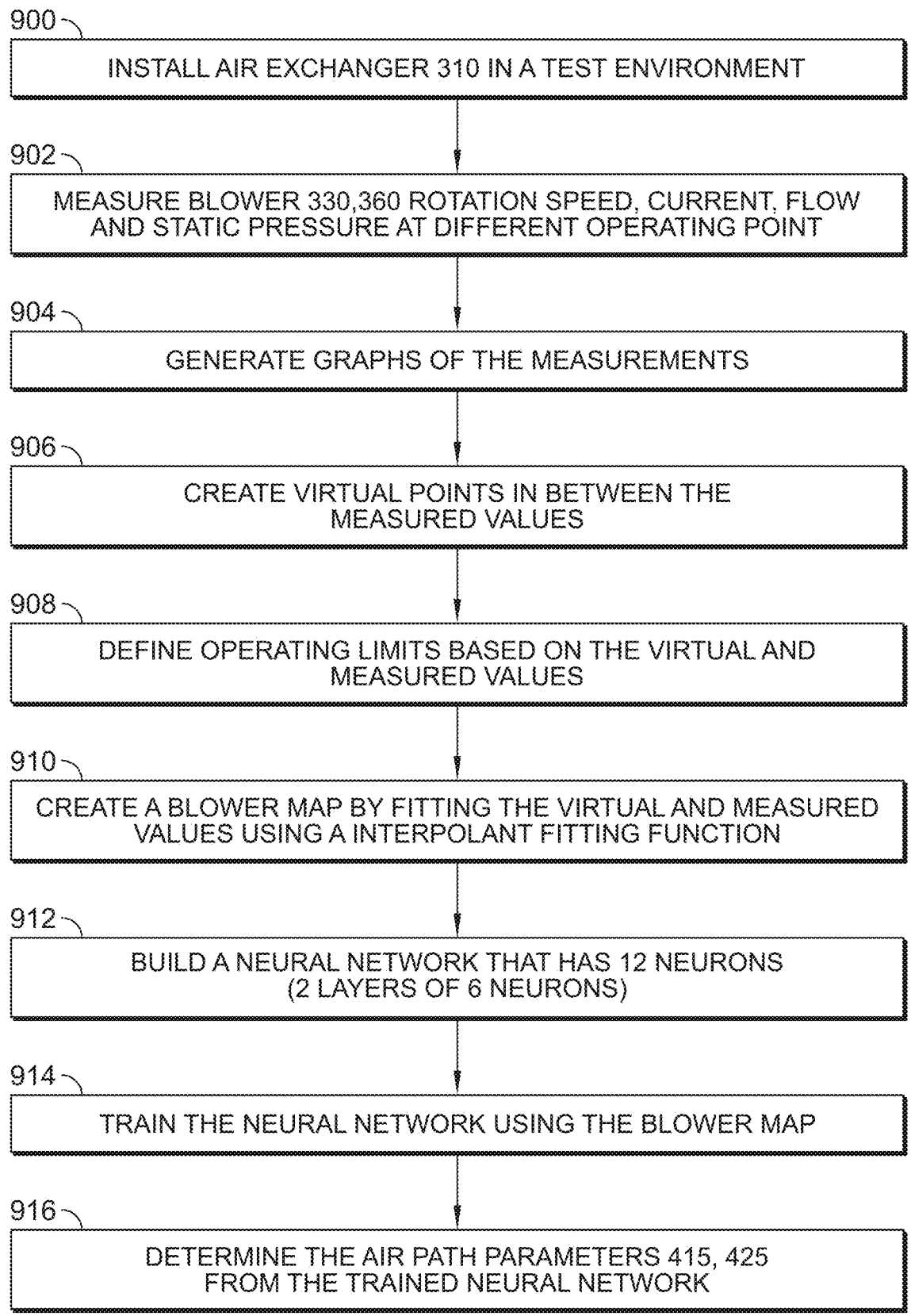
FIG. 13 is an exemplary flowchart showing the determination of the mathematical equation and its associated air path parameters.

FIGS. 7-11B generally show a method of configuring a ventilation system with automatic flow balancing derived from a neural network. These Figures show and describe the steps that are undertaken to generate the supply and exhaust mathematical equation 500a, 500b and the associated supply and exhaust air path parameters 415, 425. The ventilation device 310 is first set up in a test environment 600 at a first location (e.g., at a manufacture's warehouse). See FIG. 13 at STEP 900. The test environment includes the ability to vary the current and voltage that is applied to the supply and exhaust blower 330, 360 using a current regulator 602a, 602b and a voltage regulator 604a, 604b. In addition, this test environment includes a static pressure sensor 606a, 606b to measure the static pressure between one and four feet from the air outlet of the ventilation device 310, and preferably two feet from the air outlet of the ventilation device 310. Further, this test environment includes an air flow sensor 608a, 608b to measure the air flow rate between four and ten feet from the air outlet of the ventilation device 310, and preferably six feet from the air outlet of the ventilation device 310. Also, this test environment may include additional modifying devices or components 612a, 612b to alter or change the air temperature, alter or change the relative humidity, change the static pressure, or modify the air flow path using obstructions (e.g., filters).

Once the ventilation device 310 is set up in a test environment 600, the ventilation device 310 is operated at various levels and measurements are recorded for both the supply air path 320 and the return 350. See FIG. 13 at STEP 902. For example, each blower motor 330, 360 may be operated at a predefined set of current levels and measurements (e.g., air flow, motor speed) can be taken at each predefined set of current values. Specifically, these measurements may include the blowers 330, 360 rotational speed ($S_{1-210}$), current ($C_{1-210}$), air flow ($F_{1-210}$), and static pressure ($P_{1-210}$). An exemplary table is shown below.

| Flow | Pressure | Speed | Current |
|---|---|---|---|
| 201 | $P_1$ | $S_1$ | $C_1$ |
| ... | | | |
| 181.5 | $P_{22}$ | $S_{22}$ | $C_{22}$ |
| ... | | | |
| 165.5 | $P_{43}$ | $S_{43}$ | $C_{43}$ |
| ... | | | |
| 142 | $P_{64}$ | $S_{64}$ | $C_{64}$ |
| ... | | | |
| 121 | $P_{85}$ | $S_{85}$ | $C_{85}$ |
| ... | | | |
| 100 | $P_{106}$ | $S_{106}$ | $C_{106}$ |
| ... | | | |
| 79 | $P_{127}$ | $S_{127}$ | $C_{127}$ |
| ... | | | |
| 60 | $P_{148}$ | $S_{148}$ | $C_{148}$ |
| ... | | | |
| 37 | $P_{169}$ | $S_{169}$ | $C_{169}$ |
| ... | | | |
| 26.5 | $P_{190}$ | $S_{190}$ | $C_{190}$ |
| ... | | | |
| 25.5 | $P_{210}$ | $S_{210}$ | $C_{210}$ |

It should be understood that other and/or additional measurements may be taken in this test environment. For example, measurements may include the following: i) PWM signal, ii) static pressure at all four ports of the ventilation device (i.e., CS, WS, WE, CE), iii) air flow at all four ports of the ventilation device (i.e., CS, WS, WE, CE), iv) supply and exhaust pressure in the core, v) supply and exhaust blower motor rpms, vi) input power to the ventilation device 310, vii) input voltage to the ventilation device 310, viii) input current to the ventilation device 310, ix) input frequency to the ventilation device 310, x) supply and exhaust blower motor flux, xi) supply and exhaust blower motor current, and xii) supply and exhaust blower motor power, and etc. Further, it may be desired to take all of these measurements at various temperatures and with the heat recovery core in various operating states due to the fact that both temperature and the operation of the heat recovery core may affect the balance of the ventilation device 310. It should further be understood that the number of measured points may range from 100 to 10000, preferably between 150 and 500, and most preferably between 200 and 300.

Figure 8A:
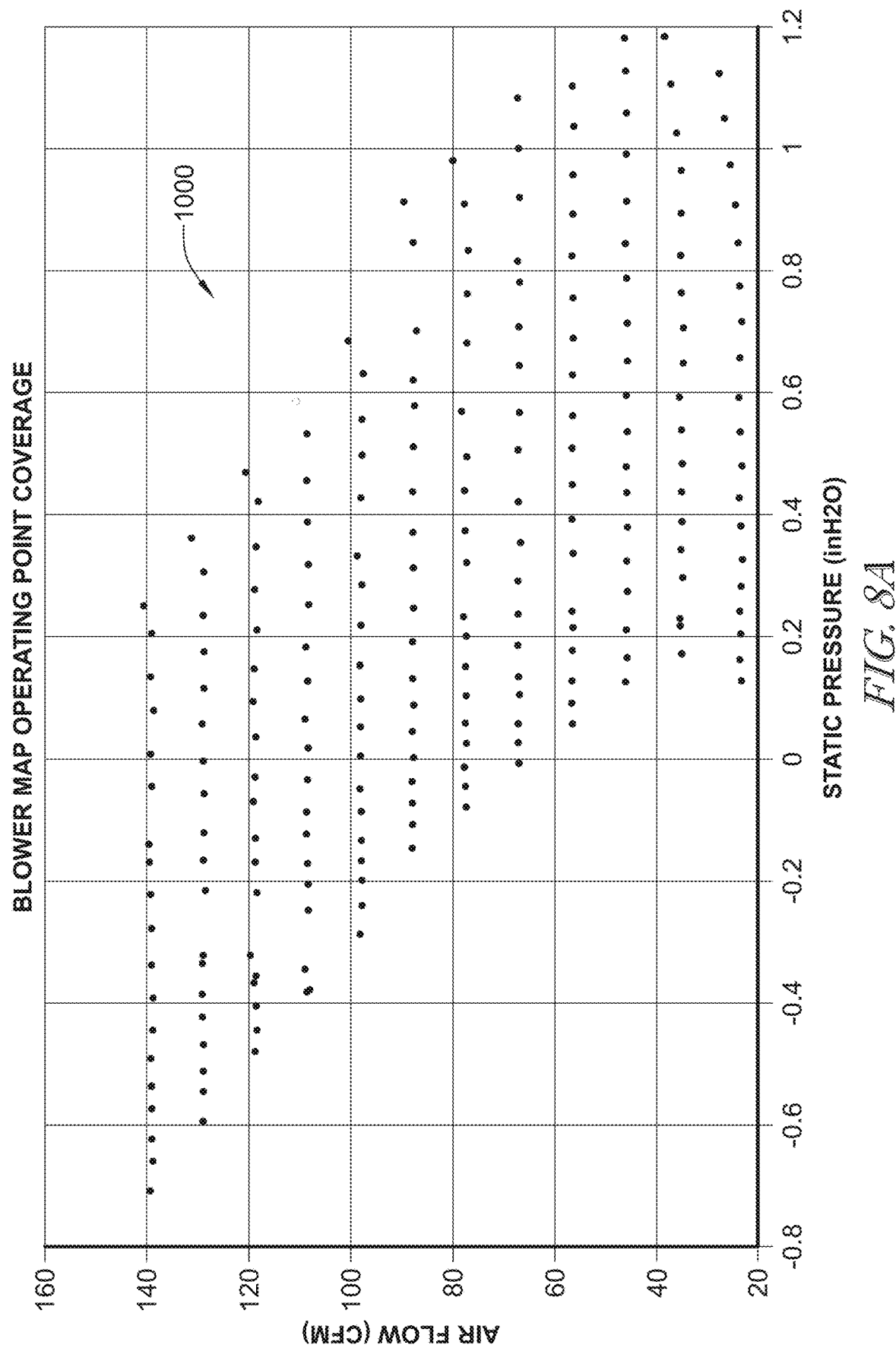
FIG. 8A is a graph containing actual measurements of the air flow and the static pressure of the ventilation device, shown in FIG. 4, for all operating points.
Figure 8B:
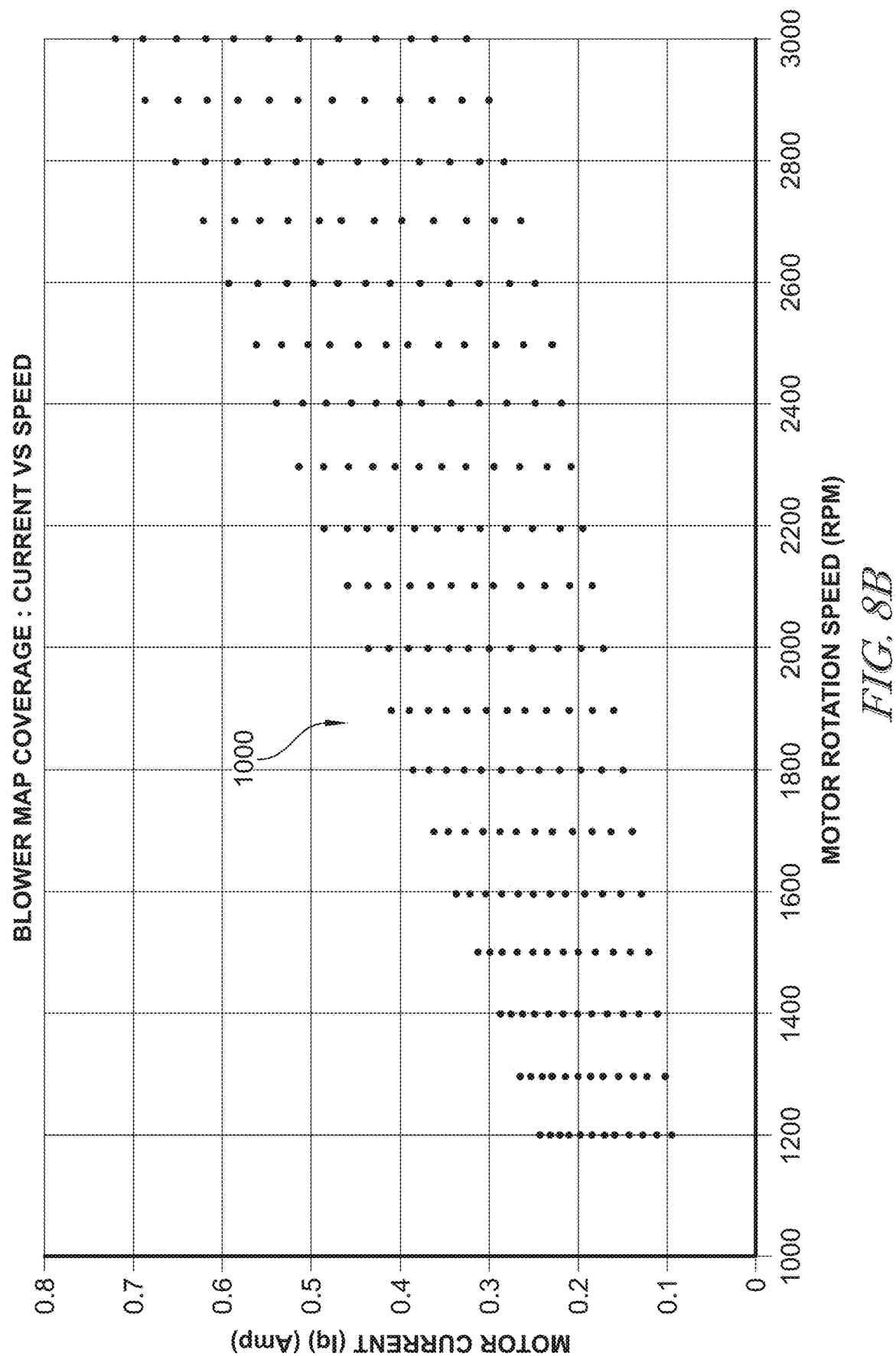
FIG. 8B is a graph containing actual measurements of the motor current and the motor rotational speed of the ventilation device, shown in FIG. 4, for all operating points shown in FIG. 7.

Once the measurements have been recorded at various operating points in STEP 902, multiple graphs may be generated from these measurements, including graphs for the supply path 320 and the exhaust path 350. See FIG. 13 at STEP 904. In particular, each of the flowing steps may be performed a first time for the supply path 320 to create a supply blower map that can be utilized to train a supply neural network and the steps can be performed a second time for the exhaust path 350 to create an exhaust blower map that can be utilized to train an exhaust neural network. Once the graphs are created, a system designer (e.g., an employee of the manufacturer of the system 300, who may be located at a first location) may review them to ensure that the data appears accurate in order to determine if the tests need to be rerun due to some error in the setup. Two of these graphs that do not contain errors are shown in FIGS. 8A-8B. Specifically, FIG. 8A is a graph that maps the static pressure measurements against the air flow measurements that were taken at various operating points. FIG. 8B is a graph that maps the motor rotational speed measurements against the motor current measurements that were taken at various operating points.

Figure 9:
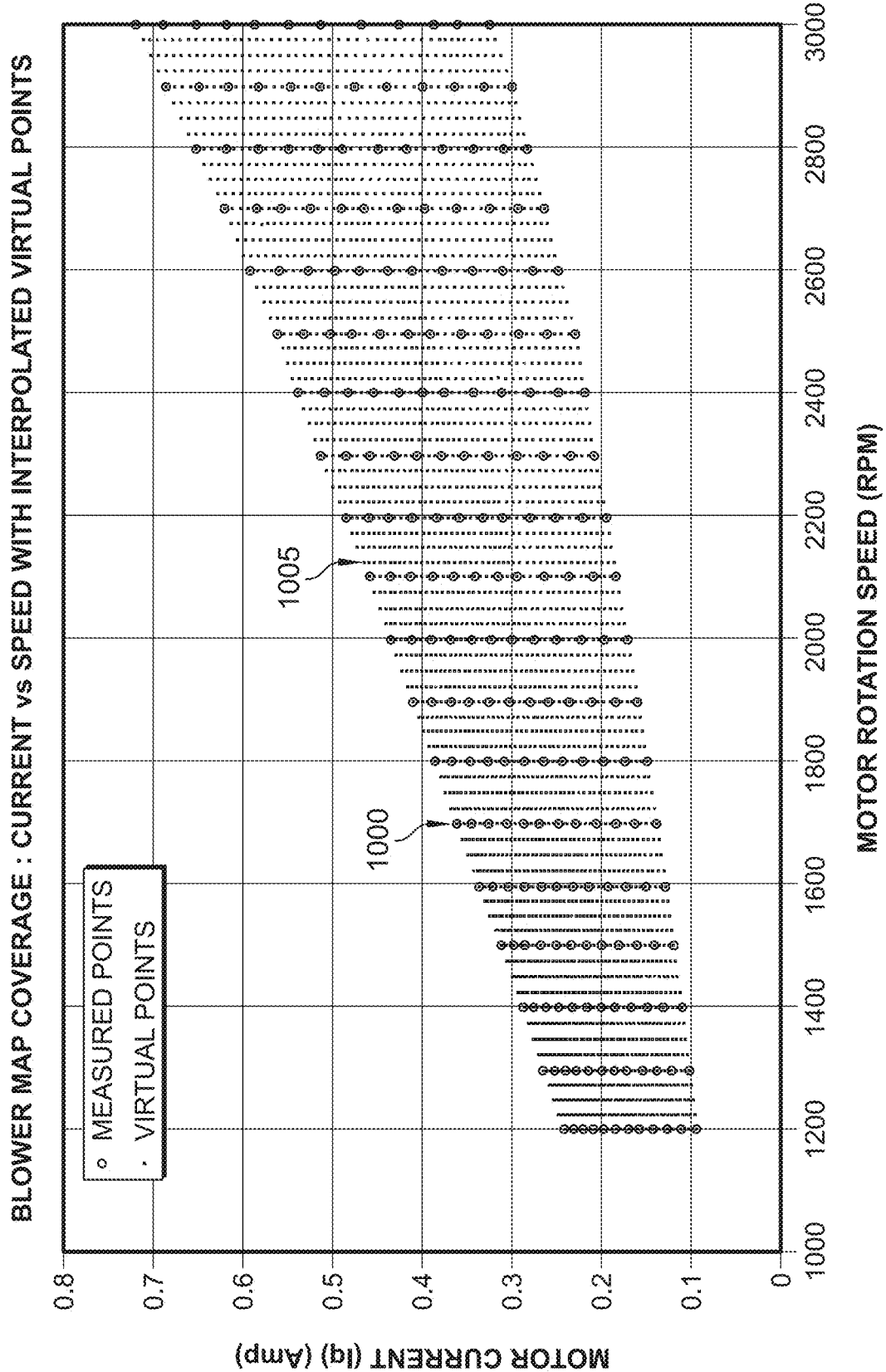
FIG. 9 is a graph containing actual measurements and virtual measurements of the motor current and the motor rotational speed of the ventilation device, shown in FIG. 4, for all operating points shown in FIG. 7.
Figure 10:
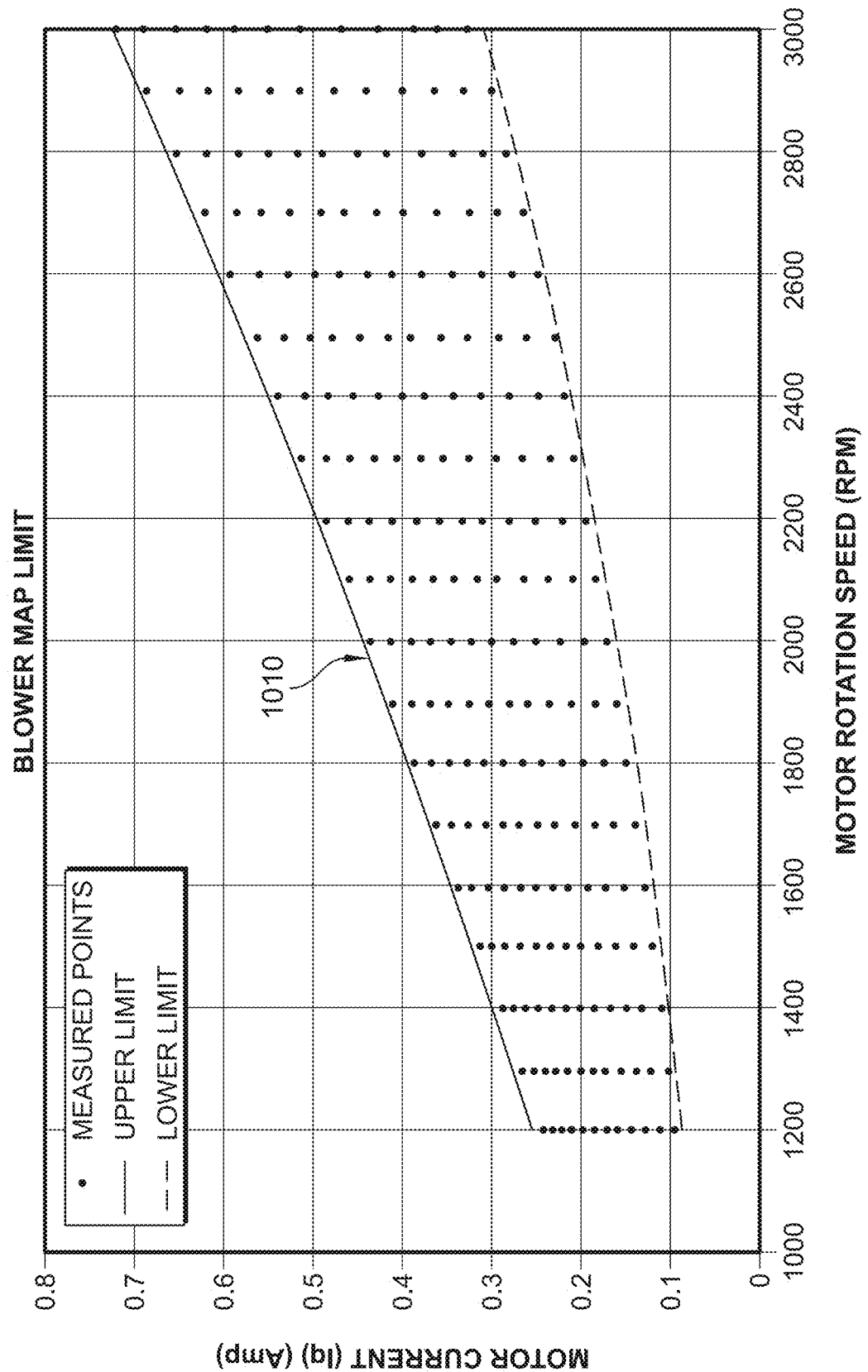
FIG. 10 is a graph showing the estimated limits of the motor current and the motor rotational speed of the ventilation device, shown in FIG. 4, within which the mathematical equation can estimate the air flow.

Once the graphs have been created and it has been confirmed that there were no errors in the measurements, a computer program can be used to generate virtual measurements. See FIG. 13 at STEP 906. Specifically, FIG. 9 shows the measured points 1000, while adding in the virtual points

1005. To calculate the values of these virtual points, a computer uses two dimensional ("2D") linear interpolation fitting function. The system designer, who is located at first location, at a manufacture's warehouse, may select how many virtual points 1050 are added between the measured points 1000. For example, system designer may desire to generate over 10,000 virtual points from the 200 measured points. This process helps to ensure that there are enough total points to accurately perform the steps described below without taking the time to record over 10,000 points. It should be understood that the ratio of virtual points 1005 to measured points 1000 should be properly selected. This is because if there are too few measured points 1000 in comparison to the virtual points 1050, the virtual points 1005 may not accurately reflect the operational parameters of the xentilation device 310. On the other hand, if there are not enough overall points (i.e., virtual points 1005 and measured points 1000), the following steps may not generate the mathematical equations 500*a*, 500*b* that accurately reflects the operational parameters of the ventilation device 310.

Once the measured points and the virtual points have been combined, the system designer defines the operating limits of the ventilation device 310. See FIG. 13 at STEP 908. Specifically, these limits, shown in a thick red line 1010 (FIG. 10), are set using a second order polynomial function that connects the outer most measured points of the ventilation device 310. Also, these limits 1010 help ensure that the mathematical equation can properly estimate the blower air flow 427*a*, 427*b*. If any virtual points 1005 or measured points 1000 are located outside of the operational limits 1010, they will be removed from the graphs and following calculations. This removal ensures that the outliers of the points 1000, 1005 do not skew the results of the mathematical equation.

Figure 11A:
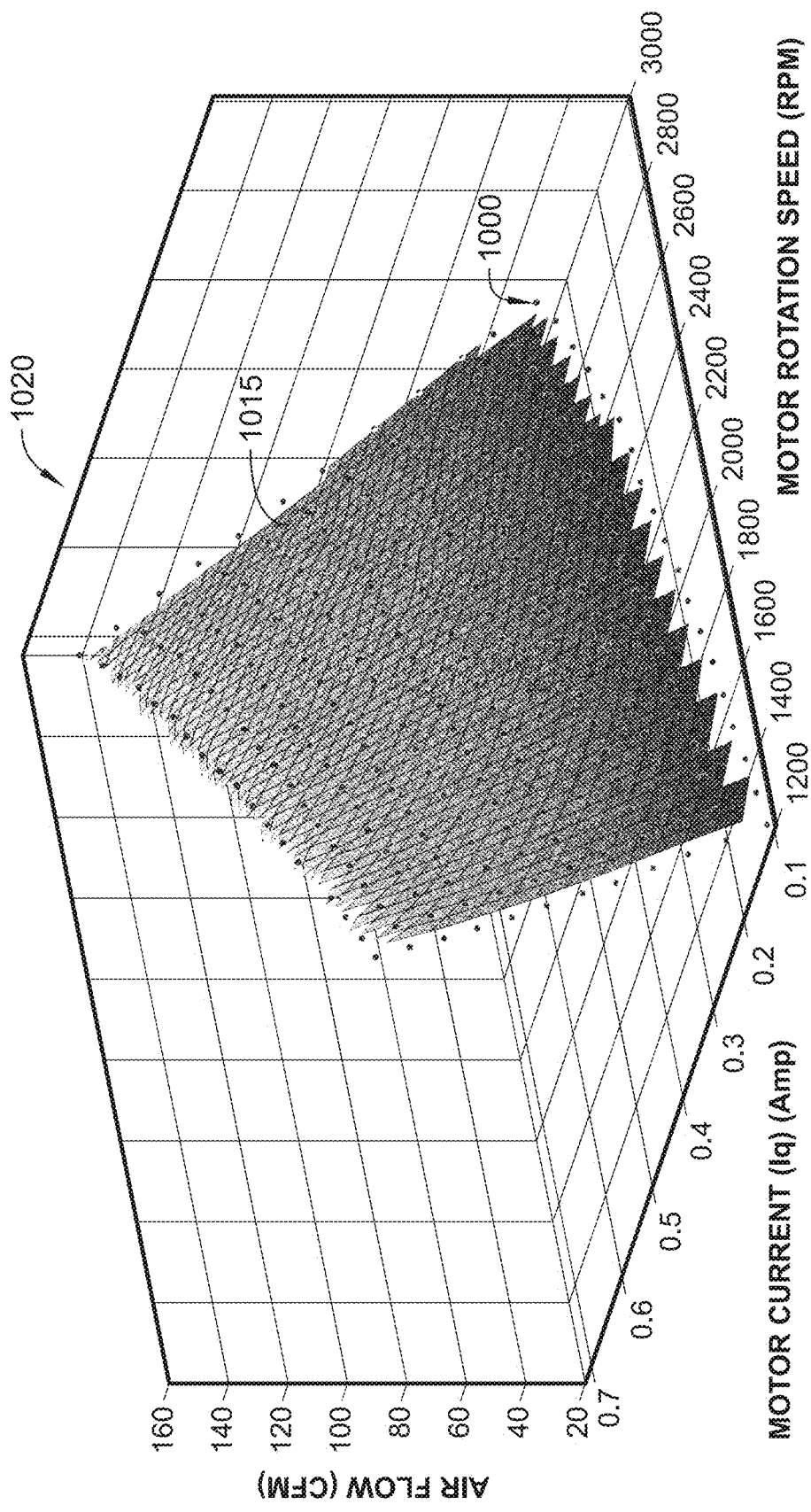
FIGS. 11A-11B are blower maps showing air flow, motor current, and motor rotational speed, for all operating points shown in FIG. 7, of the ventilation device shown in FIG. 4.
Figure 11B:
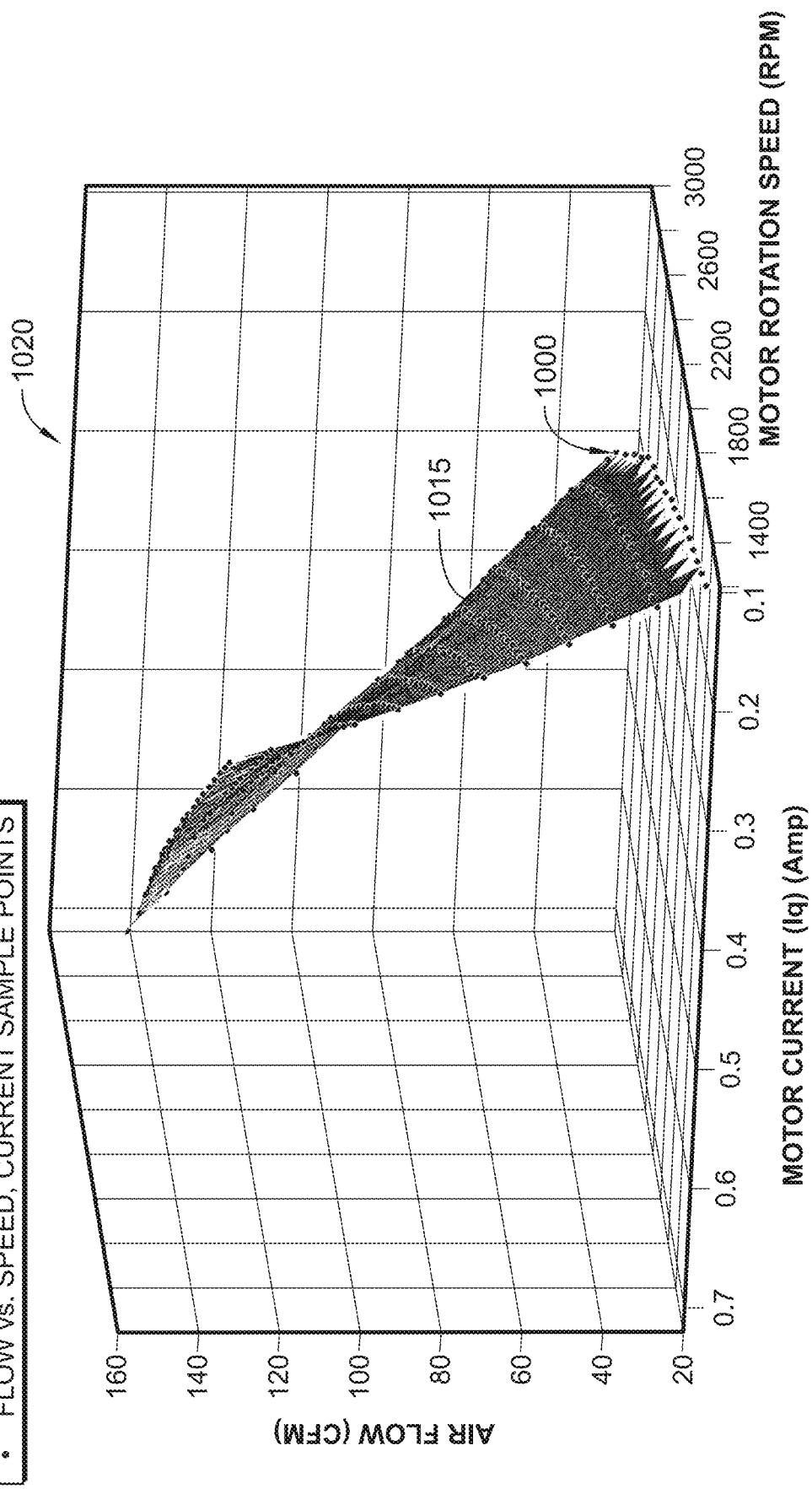

The operational limits 1010, virtual points 1005, and measured points 1000 which are then analyzed by a computer to generate a blower map 1020. See FIG. 13 at STEP 910. As discussed above, a first or supply blower map may be created for the supply path 320 and a second or exhaust blower map may be created for the exhaust path 350. Specifically, the computer uses an interpolant fitting function, such as a three dimensional ("3D") cubic spline interpolation or a three dimension linear interpolation ("3D"), to generate a surface 1015 that corresponds to the measured points 1000 and virtual points 1005 that are contained within the operating limits. FIGS. 11A-11B show the generated three-dimensional graph of a blower map 1020 that includes the surface 1015 that was generated by the interpolating function. In particular, the blower map 1020 displayed in FIGS. 11A-11B maps motor rotational speed and motor current against air flow. By fitting the virtual points 1005 and measured points 1000 with this surface, an infinite amount of points have been created, which in turn will allow the mathematical equation 500*a*, 500*b* to be able to estimate the air flow based on any current and speed of the blower motor 385, 390. In an alternative embodiments, measured points 1000, without virtual points 1005, may be fitted with the interpolant fitting function to generate the blower map 1020. In further embodiments, the surface 1015 of the blower map 1020 may be created based upon the measured points 1000 without generating the virtual points 1005. In even further embodiments, a smoothing function may be applied to the measured points 1000 or a combination of the measured points 1000 and the virtual points 1005 before forming the surface 1015 of the blower map 1020. In another embodiment, the bower map may be: (i) a combination of the virtual points 1005 and measured points 1000 without a surface 1015, (ii) the virtual points 1005 without a surface 1015, or (iii) the measured points 1000 without a surface 1015. Even further, combinations of these alternative embodiments may be used.

Once the blower map 1020 is generated for the supply path 320 and the exhaust path 350, the system designer can generate mathematical equations 500*a*, 500*b* for use in the respective neural network estimators 455*a*, 455*b*. See FIG. 13 at STEP 912. The supply and exhaust flow estimators 445*a*, 445*b* utilize the following flow estimation equation Flow(X)=Sig(Sig(Sig(X W1+B1)·W2+B2)·W3+B3). In this equation, "X" is an input matrix (i.e., X=[Speed Current]) that includes the estimated RPM 439*a*, 439*b* and the motor estimated current 457*a*, 457*b*. In addition, "W" and "B" are weighted matrices (e.g., $W_1$-$W_3$) and the bias matrices (e.g., $B_1$-$B_3$), shown below.

$$W_1 = \begin{bmatrix} w_{11} & \cdots & w_{61} \\ \vdots & \ddots & \vdots \\ w_{12} & \cdots & w_{62} \end{bmatrix} \quad B_1 = [b_1 \ldots b_6]$$

$$W_2 = \begin{bmatrix} w_{11} & \cdots & w_{61} \\ \vdots & \ddots & \vdots \\ w_{16} & \cdots & w_{66} \end{bmatrix} \quad B_2 = [b_1 \ldots b_6]$$

$$W_3 = \begin{bmatrix} w_1 \\ \vdots \\ w_6 \end{bmatrix} \quad B_3 = [b_1]$$

Figure 12:
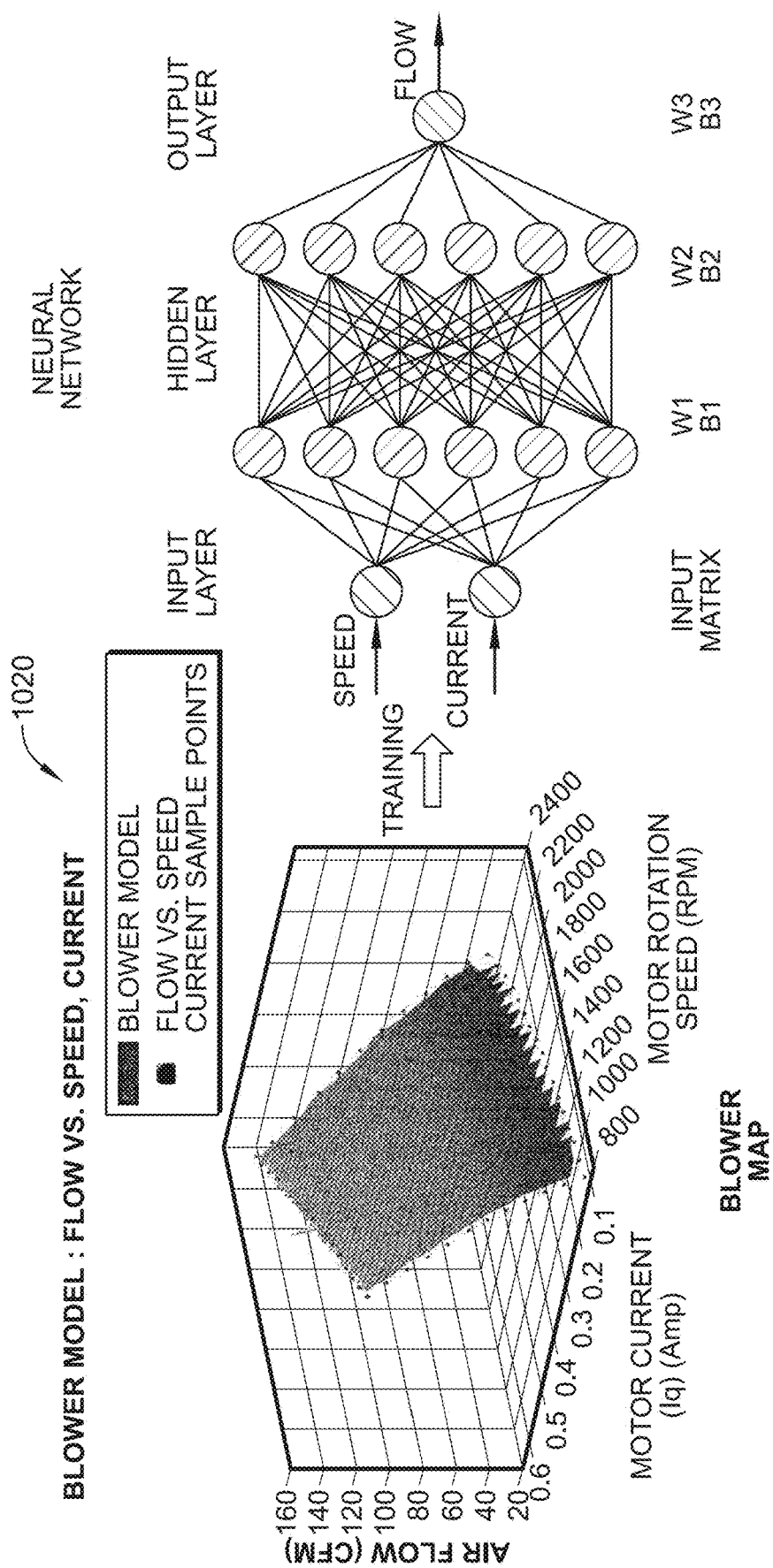
FIG. 12 shows a method of determining a mathematical equation using the blower maps from FIGS. 11A-11B to train a neural network to estimate the air flow from the ventilation device shown in FIG. 4.

To determine the weighted matrices and the bias matrices, the system designer sets up a neural network (see STEP 914). For example, the neural network may include a network that has 12 neurons (2 layers of 6 neurons). In STEP 916 and as shown in FIG. 12, the blower map 1020 and an activation function are used to train (e.g., determine the weighted matrices and the bias matrices) the neural network estimator. In this exemplary embodiment, the activation function is a Sigmoid $$\left(\text{i.e., } Sig(z) = \frac{2}{1+e^{-2z}} + 1\right).$$

Once the neural network estimator is trained (e.g., the weighted matrices and the bias matrices are demined), these values may be programed into the ventilation device 310 as the air path parameters 415, 425.

The performance of the ventilation device 310 will then be measured using this mathematical equations 500*a*, 500*b*. If the performance of the ventilation device 310 is acceptable, then the mathematical equation 500*a*, 500*b* and its associated air path parameters 415, 425 are set to be installed in like model units at the factory. However, if the performance is not acceptable, STEPS 900-910 and 916-920 may be repeated until the performance of ventilation device 310 is acceptable. Mainly, the performance of the ventilation device 310 is acceptable if it is within 10% of being balanced, which requires the supply and exhaust air paths within +/−5% of the measured air flow from the blower motor 330, 360, as determined within the test environment 600. In an alternative embodiment, the mathematical equations 500*a*, 500*b* for the supply flow controller 410 and the exhaust flow controller 420 that are programed into the ventilation device 310 at the factory may be updated after the ventilation device 310 is installed within the building or structure by: (i) a technician physically connecting a data cable to the ventilation device 310, (ii) by a technician using a local network (e.g., Bluetooth or Wi-Fi) to wireless connect to the ventilation device 310, or (iii) by a centralized controller connecting to the ventilation device 310 over a distributed network (e.g., cellular network). It should be understood, that in the input matrix for the mathematical equations 500a, 500b may be altered to include other variables (e.g., temperature), other activation functions may be used (e.g., see the below table of activation functions), neurons may be added or subtracted from the neural network, or a different mathematical equation may be used that provides additional rewards and penalties to the network during its training.

FIGS. 14A-14B, 16, and 18-19, provide exemplary graphs showing the performance of the ventilation device 310 using the neural network derived mathematical equations 500a, 500b set forth above in the second location, such as a house, apartment, or office. At this second location, the user may set the user defined air flow set point 364 using a controller to select the desired CFM output of the system 300 into the environment 305. The controller may be: (i) a wall controller that is coupled to the ventilation device 310 using a wire, (ii) a wall controller that is coupled to the ventilation device 310 using a wireless connection (e.g., Bluetooth, Wi-Fi), (iii) a mobile device that is wirelessly coupled to the ventilation device 310, or (iv) a combination of any of these controllers. For example, the user may specify the user defined air flow set point 364 to a value between 40 CFM to 300 CFM depending on the operating environment 305.

Figure 14A:
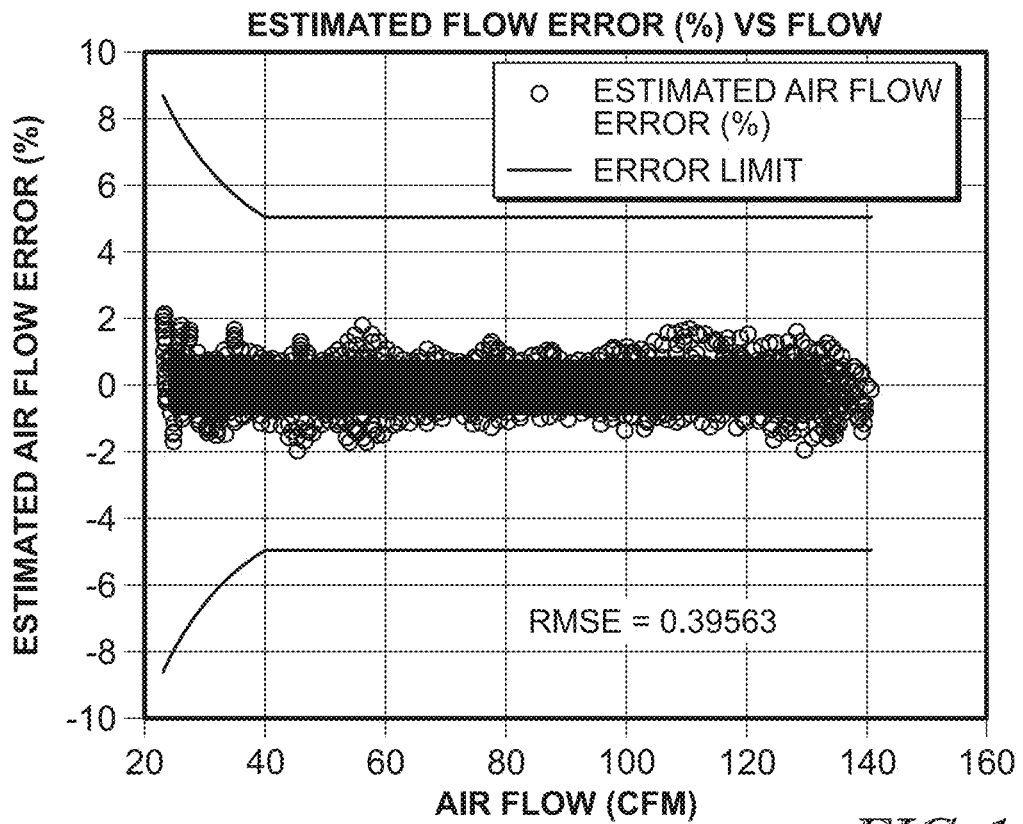
FIG. 14A provides contains a graph that shows the percentage of air flow estimation errors, at all operating air flow rates shown in FIG. 7, and applicable error limits for the ventilation device shown in FIG. 4.
Figure 14B:
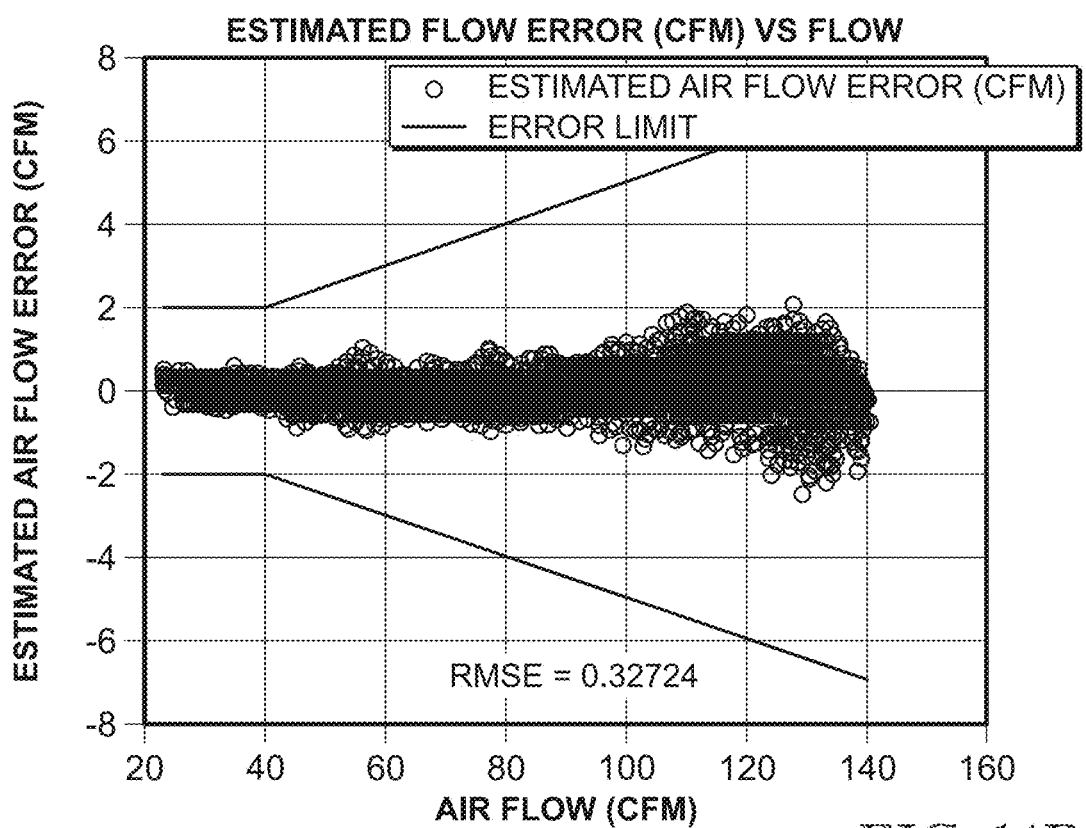
FIG. 14B provides contains a graph that shows the air flow estimation errors, at all operating air flow rates shown in FIG. 7, and applicable error limits for the ventilation device shown in FIG. 4.

FIG. 14A displays the air flow of the ventilation device 310 graphs against estimated air flow error percentage, while FIG. 14B displays the air flow of the ventilation device 310 graphed against the estimated air flow error. As seen in the graphs contained within FIGS. 14A-14B, the ventilation device 310 operates within +/−5% of the measured air flow from the blower motor 330, 360, as determined within the test environment 600. This meets and far exceeds the 10% requirement of the building codes (e.g., Canada's National building codes, including 9.32.3.4-9.32.3.5, and CAN/CSA-F326-M91). In addition, to meeting and exceeding the building code requirements, the ventilation device 310 does not require manual balancing at the time of installation nor does it require the ventilation device 310 to be rebalanced due to season changes, which saves time and cost.

Figure 15A:
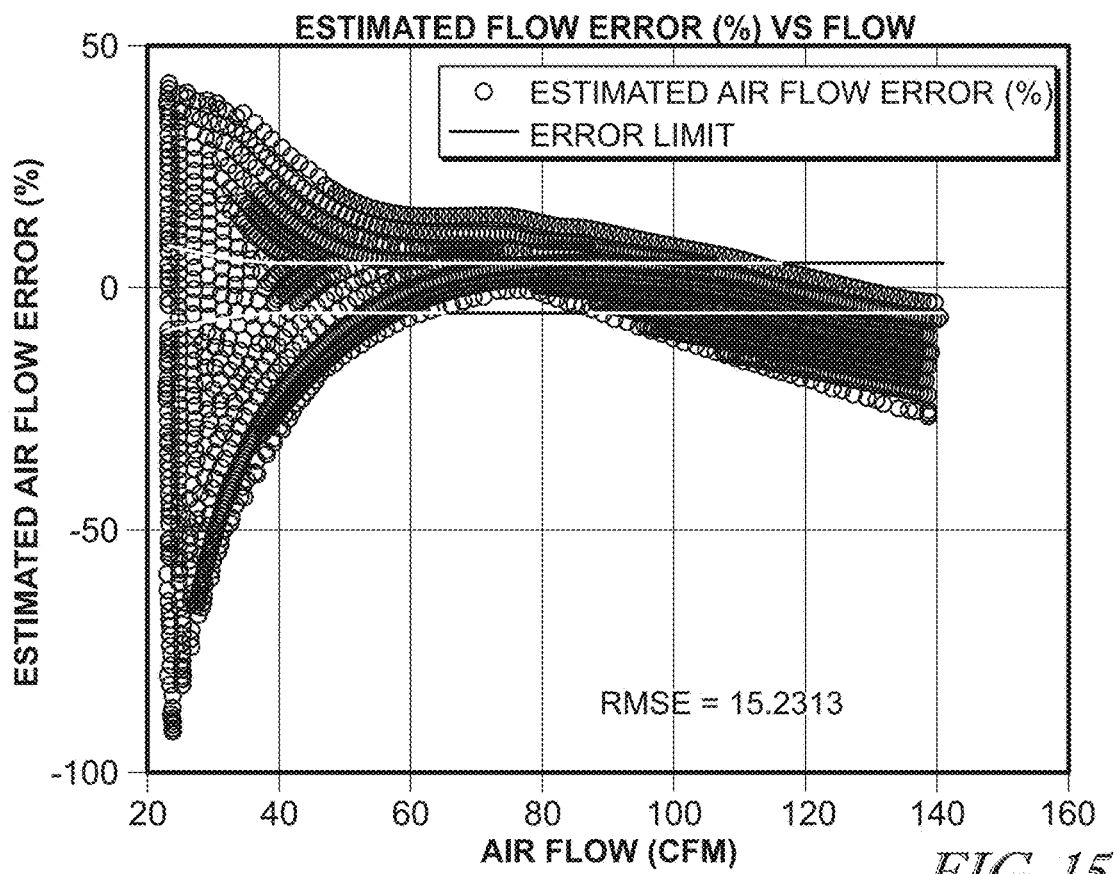
FIG. 15A provides contains a graph that shows the percentage of air flow estimation errors, at all operating air flow rates shown in FIG. 7, and applicable error limits for an air exchanger that utilizes a polynomial equation.
Figure 15B:
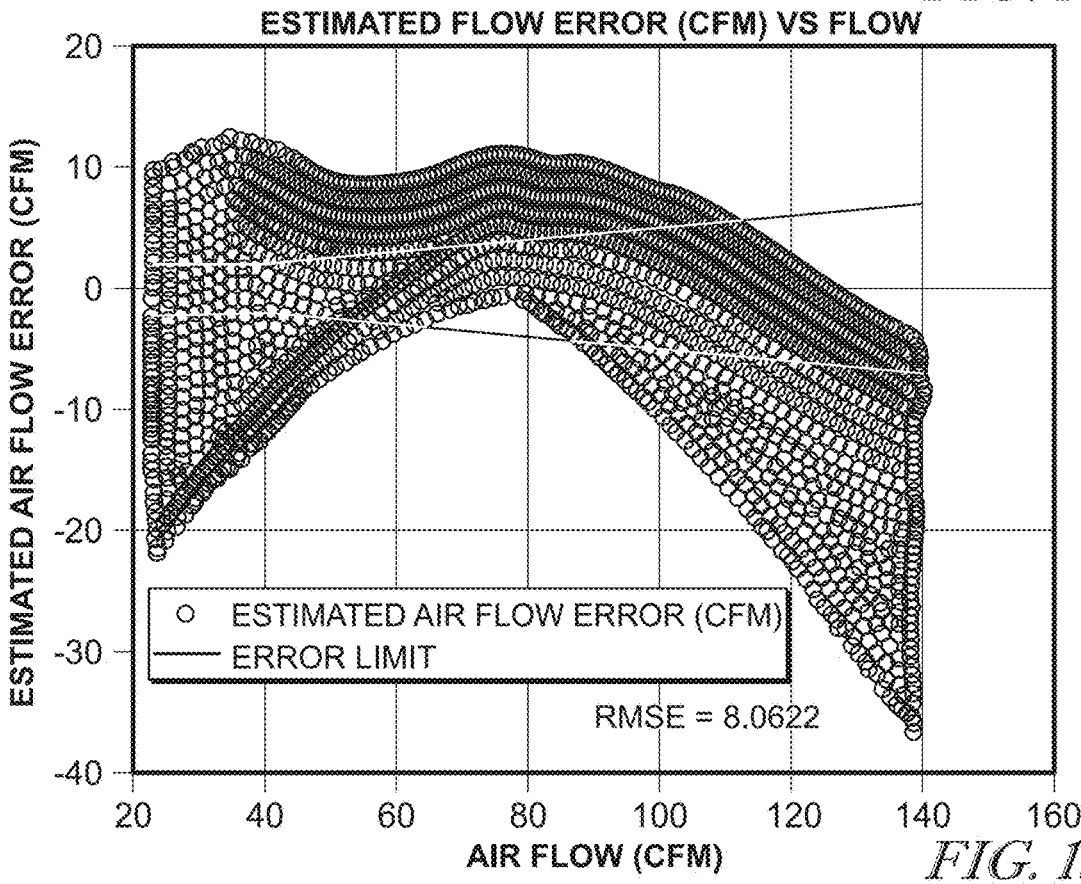
FIG. 15B provides contains a graph that shows the air flow estimation errors, at all operating air flow rates shown in FIG. 7, and applicable error limits for the air exchanger that utilizes the polynomial equation.
Figure 16:
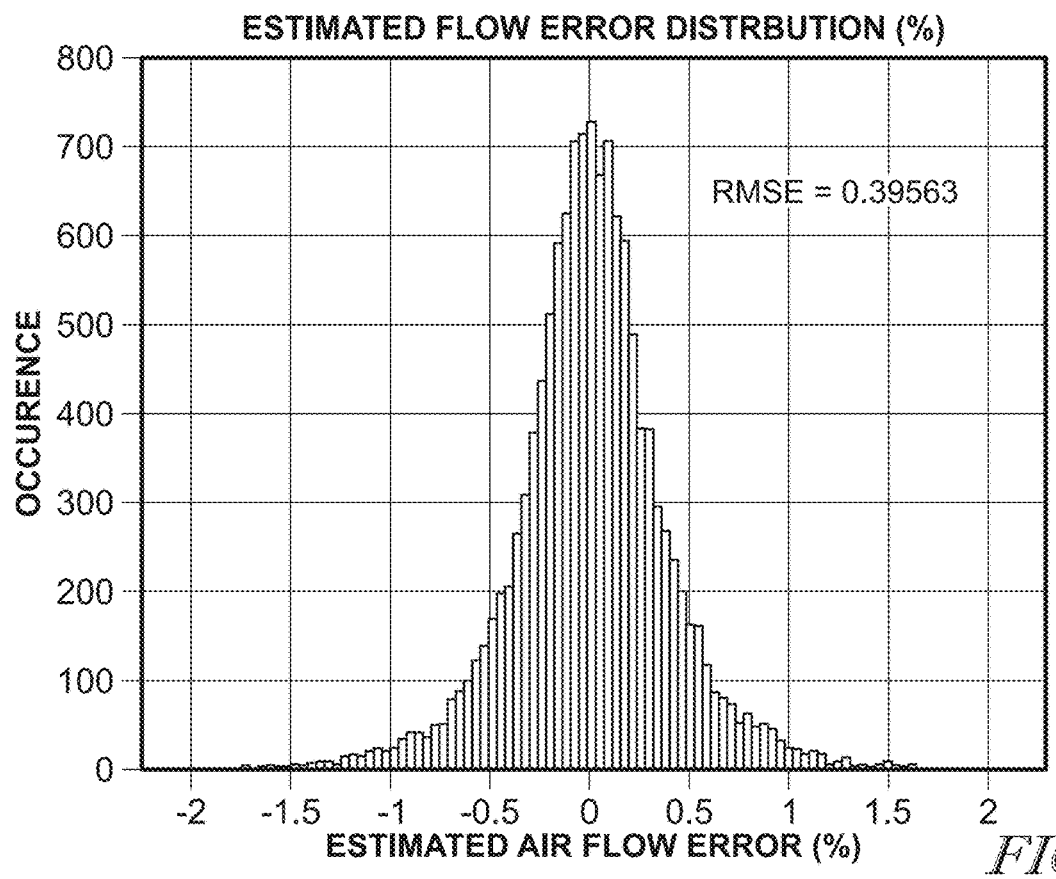
FIG. 16 provides a graph showing the distribution of the percentage of the air flow estimation errors shown in FIG. 14A.
Figure 17:
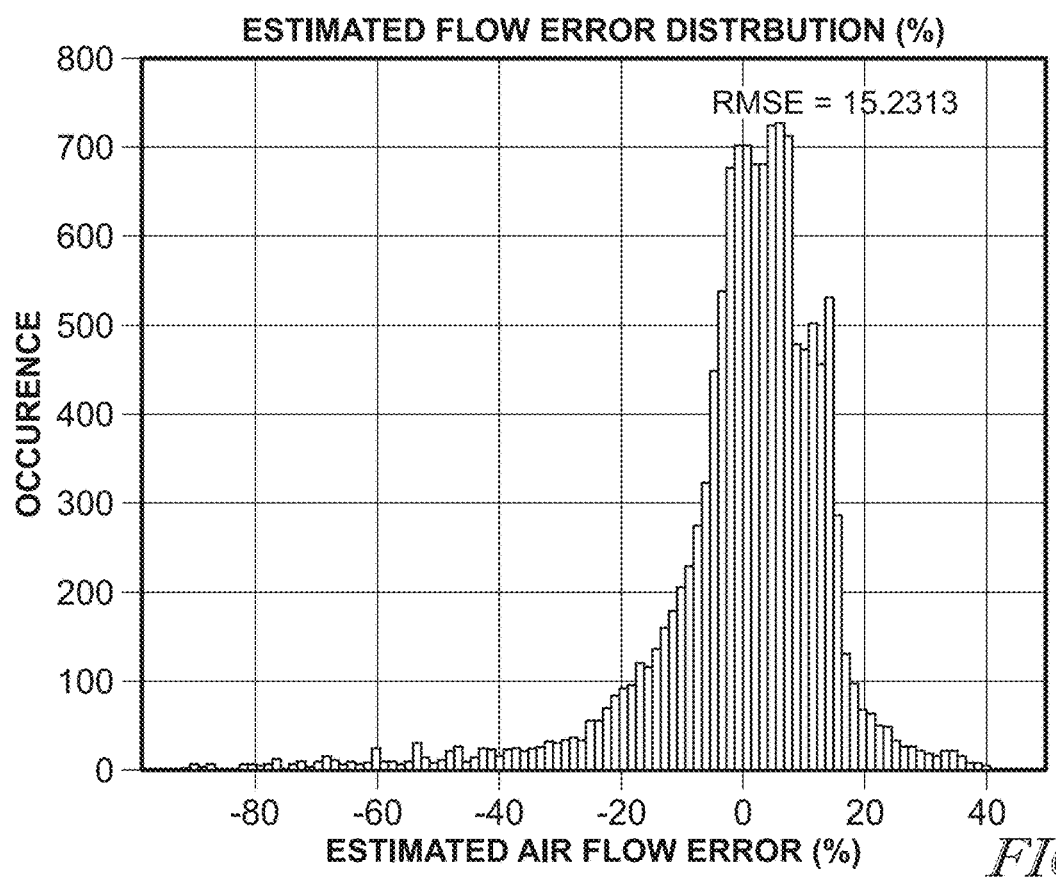
FIG. 17 provides a graph showing the distribution of the percentage of the air flow estimation errors shown in FIG. 15A.
Figure 18:
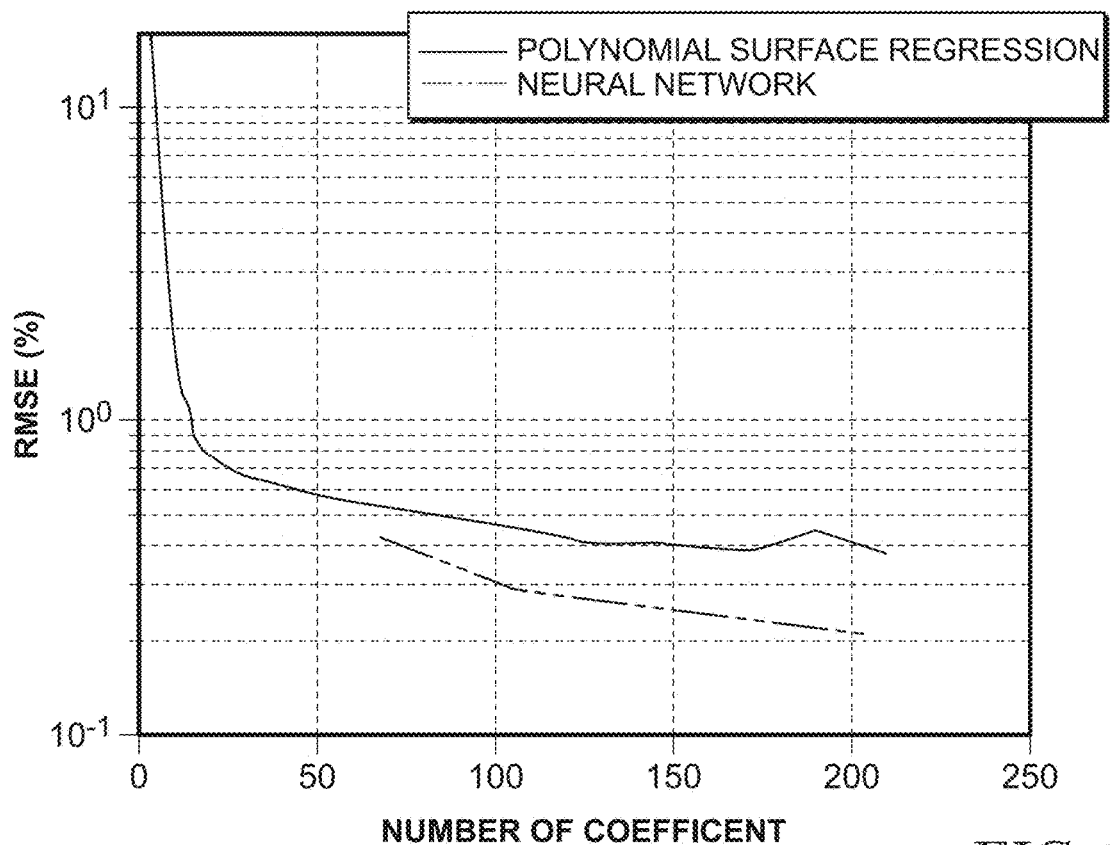
FIGS. 18-19 provides graphs comparing the performance of the ventilation device shown in FIG. 4 and the air exchanger that utilizes the polynomial equation.
Figure 19:
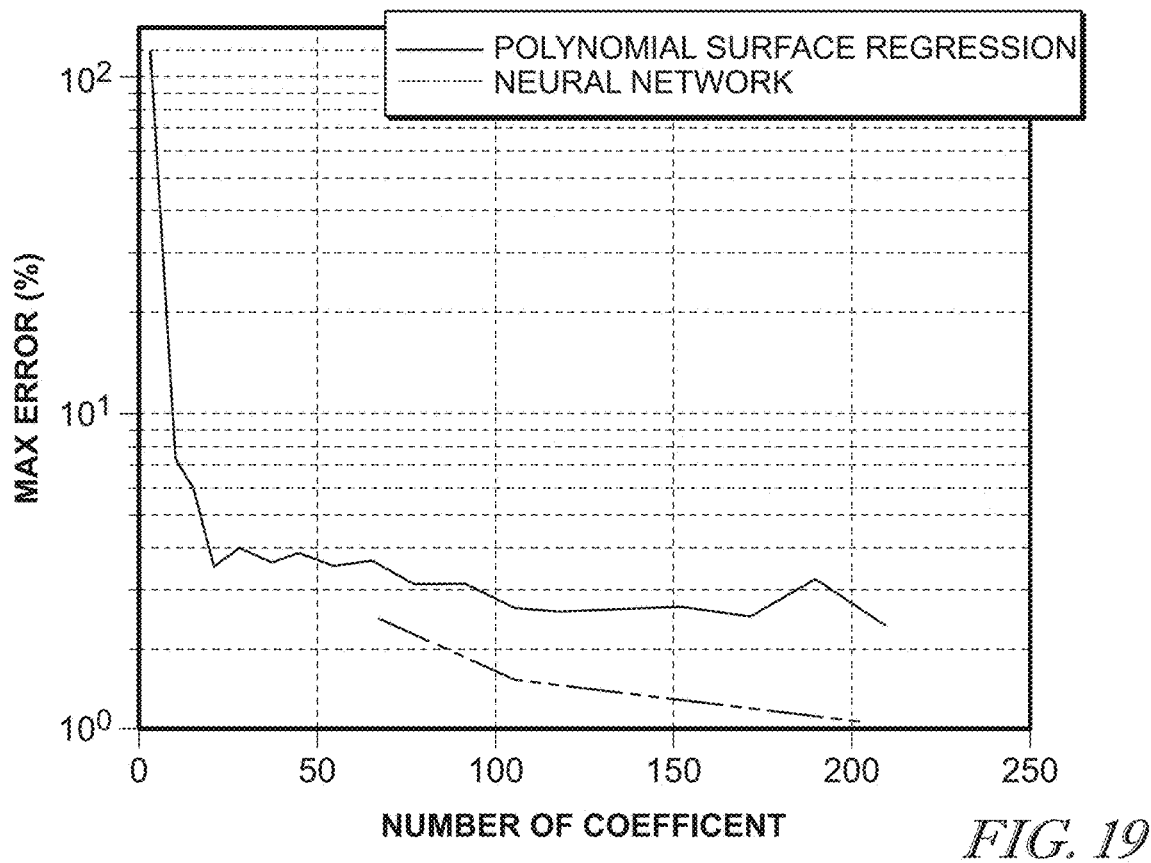

FIGS. 15A-15B, 16, and 17-18, provide exemplary graphs showing the performance of an air exchanger utilizing a polynomial equations. In particular, FIGS. 15A-15B and 17 show the performance of the air exchanger that utilizes a first order polynomial equation for speed of the motor and a second order polynomial equation for current of the motor, while FIGS. 18-19 show the performance of the air exchanger in connection with various number of coefficient for various degree of polynomial equations. Review of the graphs provided in connection with FIGS. 15A-15B, show that the use of a polynomial equation does not meet the building codes. Additionally, FIGS. 18-19 show that the ventilation device 310 that utilizes the neural network mathematical equation is approximately ten times closer to being balanced in comparison to the air exchanger that utilizes low order polynomial equation (e.g., less than $6^{th}$ order). And even if an air exchanger could theoretically utilize a higher order polynomial equation (e.g., $18^{th}$ order) without the polynomial equation becoming unstable, which usually occurs around a $5^{th}$ order equation, the ventilation device 310 that utilizes the neural network approach is still approximately two times closer to being balanced. Accordingly, the use of a neural network in connection with the ventilation device 310 is far superior to an air exchanger that utilizes a polynomial equation approach.

FIGS. 1-14B, 16, 18-19 describe the use of a single neural network based mathematical equations 500a, 500b and a single set of air flow parameters 415, 425 for each blower motor 385, 390. In alternative embodiments, it may be desirable to have multiple mathematical equations 500a, 500b and multiple sets of air flow parameters 415, 425 for each blower motor 385, 390. This may be advantageous because each mathematical equation and set of air flow parameters may be used in a specific situation, such as for different air densities that can occur in different geographic locations where temperature, humidity, elevation, relative to sea level and atmospheric pressure can each differ. For example, it may be advantageous to have at least five separate mathematical equations and sets of air flow parameters, where: i) a first set is used when the ambient air between −20° to 0°, ii) a second set is used when the ambient air between 1° to 20°, iii) a third set is used when the ambient air between 21 to 40, iv) a fourth set is used when the ambient air between 41° to 60°, and v) a fifth set is used when the ambient air between 61° to 80°. In other embodiments, it may be advantageous to have at least five separate mathematical equations and sets of air flow parameters, where: i) a first set is used when the relative humidity is between 0 to 20, ii) a second set is used when the relative humidity is between 21 to 40, iii) a third set is used when the relative humidity is between 41 to 60, iv) a fourth set is used when the relative humidity is between 61 to 80, and v) a fifth set is used when the relative humidity is between 81 to 100.

In other embodiments, it may be advantageous to have at least twenty separate mathematical equations and sets of air flow parameters, where each set covers a different combination of temperature ranges and relative humidity ranges. Other embodiments may include a motorized proportional damper 395, such as the motorized damper disclosed within Ser. No. 16/242,498, filed on Jan. 9, 2019 to bring the pressure within the flow estimation operating limits. In other embodiments, it may be desirable to have multiple mathematical equations and multiple sets of air flow parameters to account for different air filters. For example, one mathematical equation and its air flow parameter may be used for an air filter having low flow characteristic and another mathematical equation and its air flow parameter may be used for an air filter having high flow characteristic. In even further alternative embodiment, a neural network may be utilized that can account for the temperature changes, whether the heat recovery core is operations, and whether an air handler or HVAC unit is installed, and the type of air filter that is installed. This neural network will include additional inputs, additional neurons, and will require additional training over the neural network described above. It should also be understood that other neurons or configurations of neurons may be utilized no matter the number of inputs.

Figure 2B:
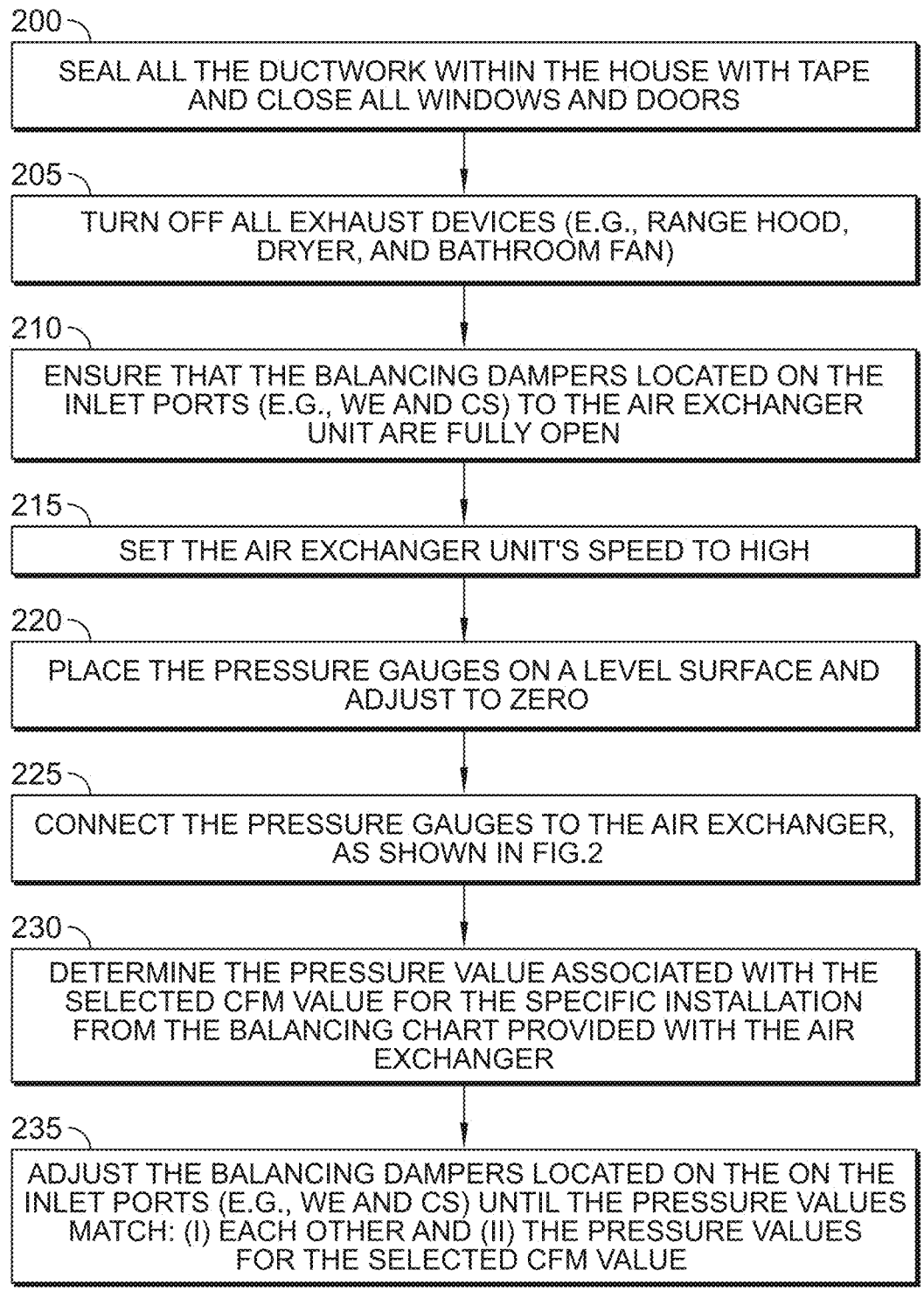
FIG. 2B is an exemplary flowchart of the steps taken to manually balance the air exchanger unit.
Figure 3B:
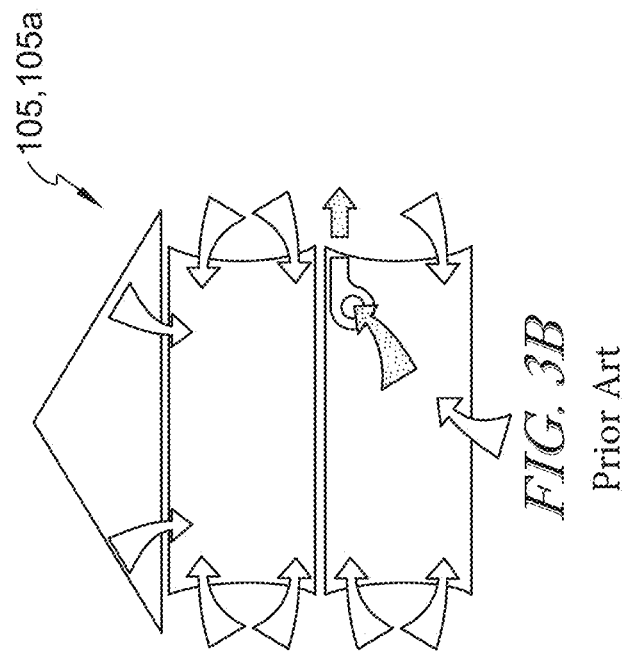
FIG. 3B is a view of an exemplary ventilation system that has a negative air pressure imbalance.
Figure 3A:
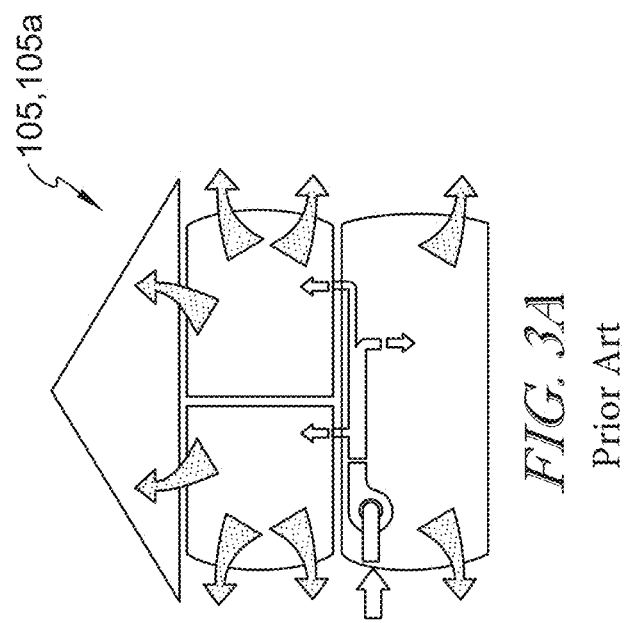
FIG. 3A is a view of an exemplary ventilation system that has a positive air pressure imbalance.
Figure 20A:
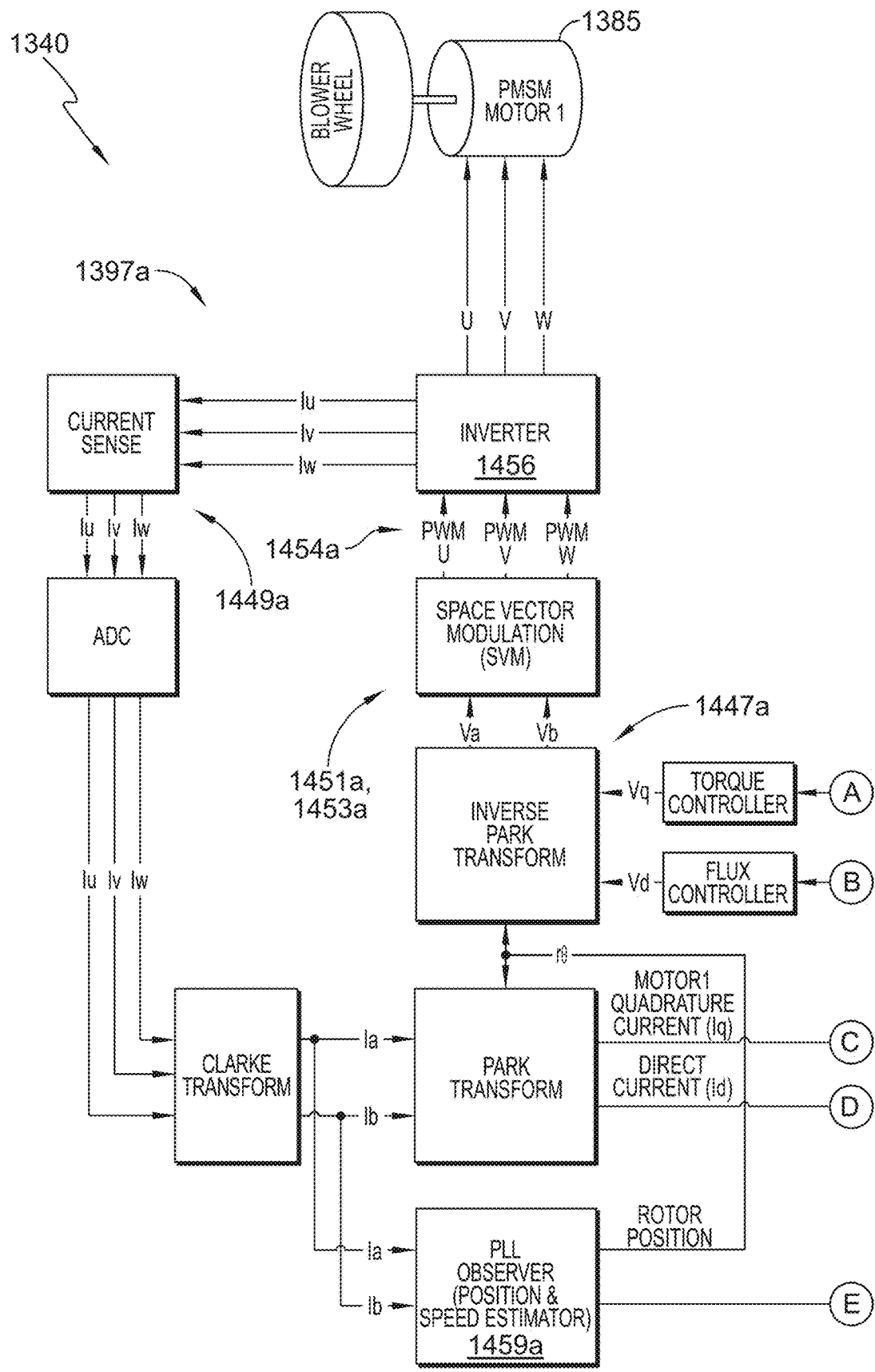
FIGS. 20A-20B are circuit diagrams of the control circuit for a second exemplary embodiment of an ventilation device according to the present disclosure.
Figure 20A:
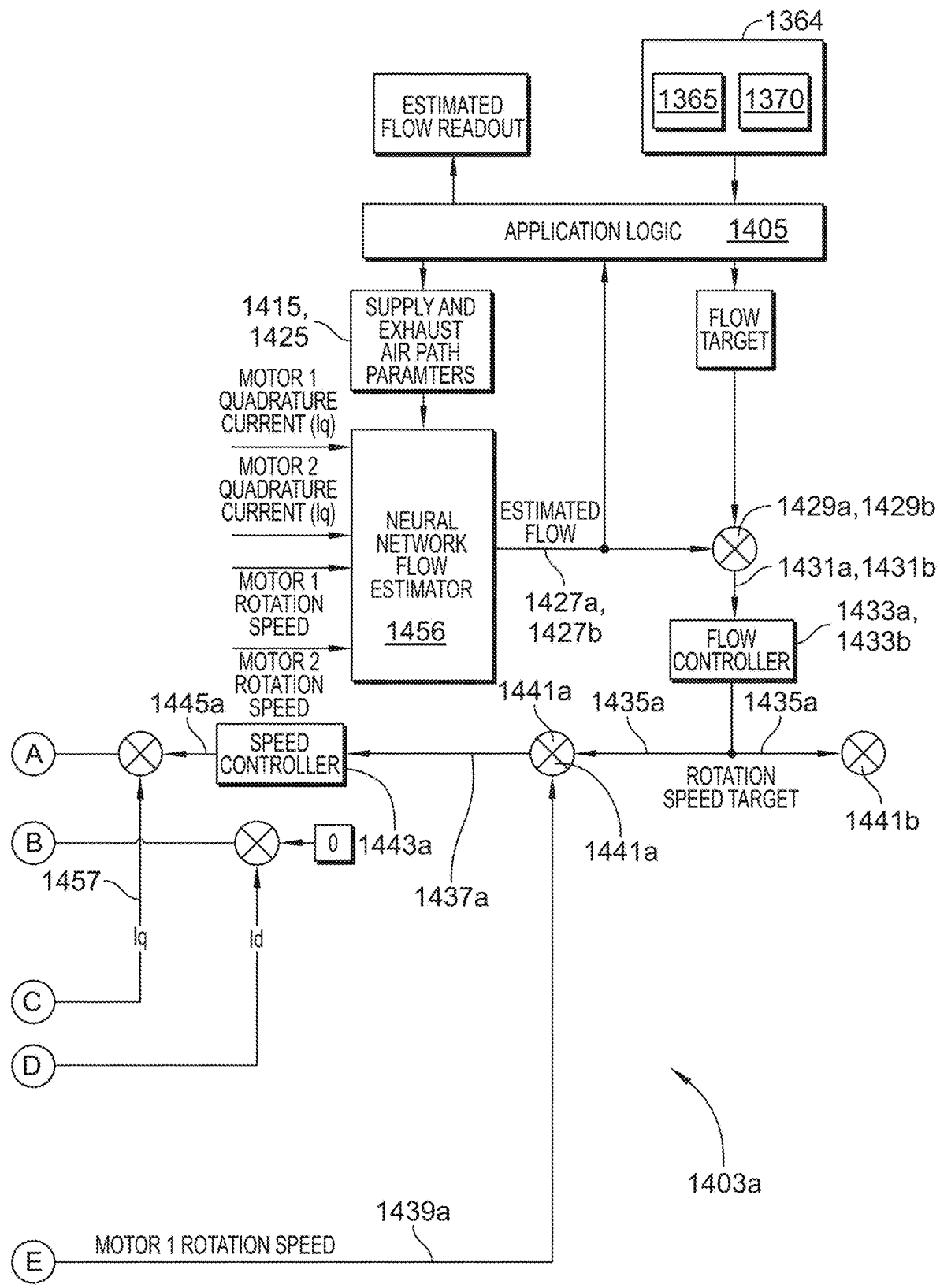
Figure 20B:
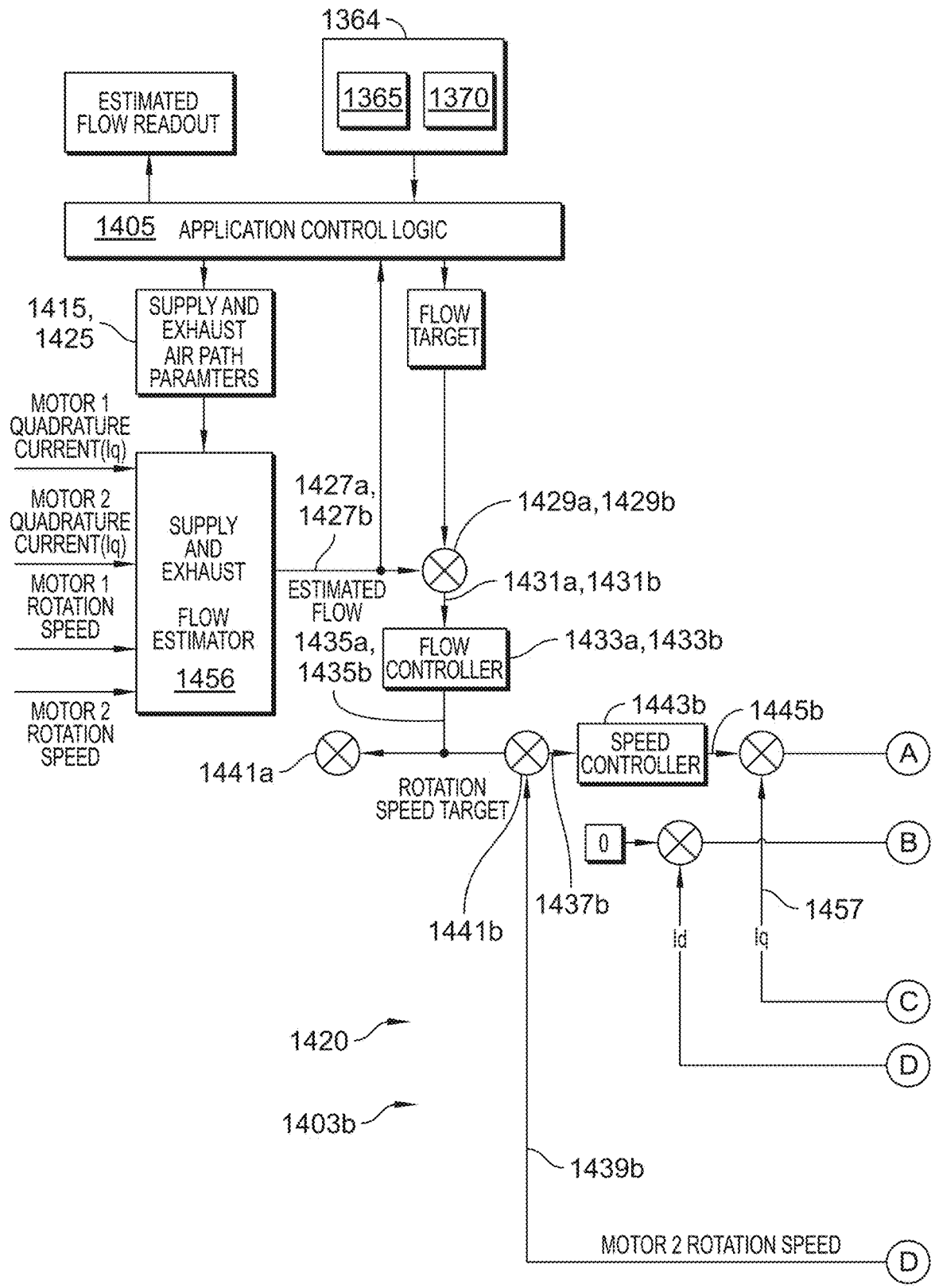
Figure 20B:
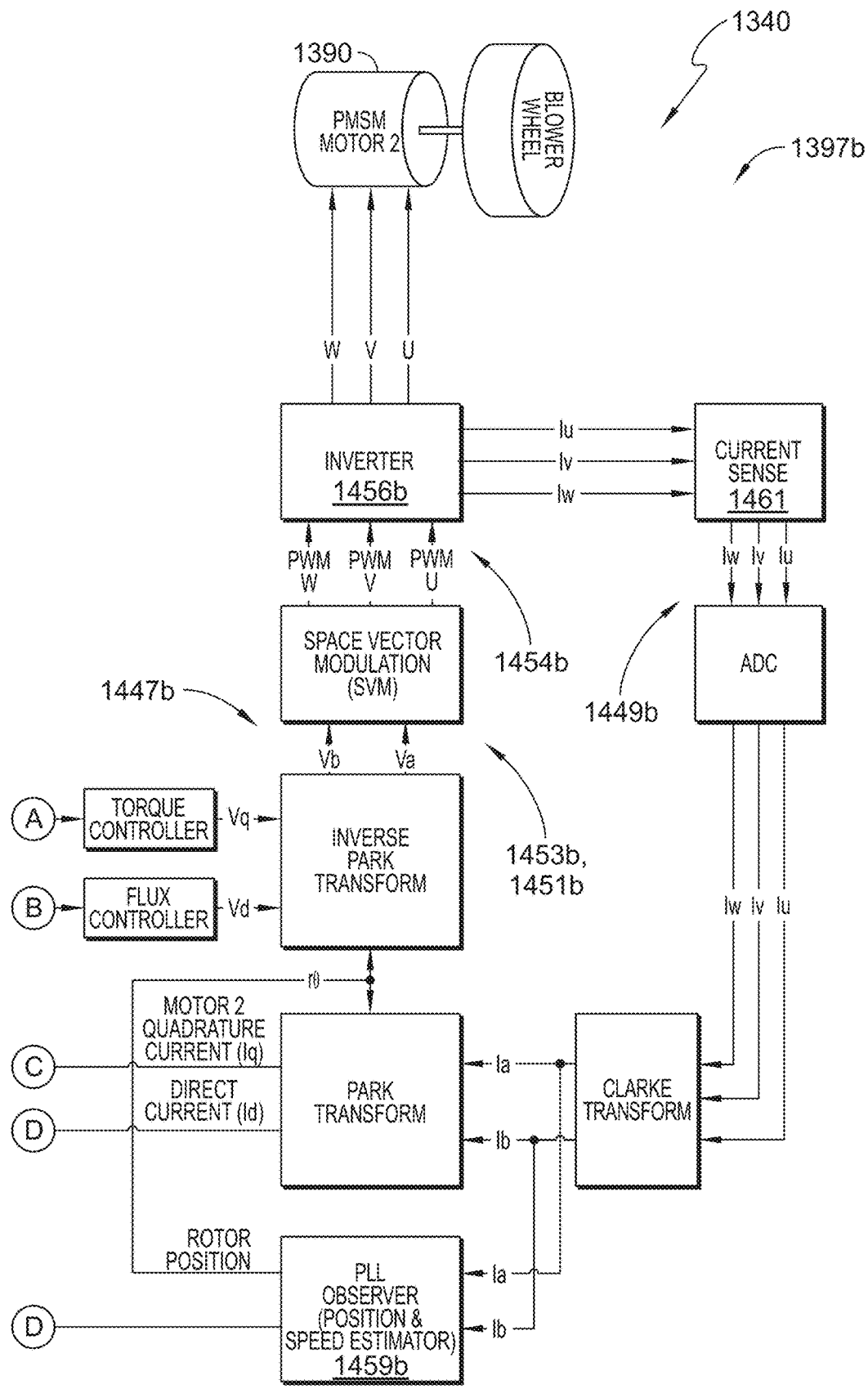

FIGS. 20A-2B describe a second embodiment of a ventilation device 1310 that utilizes a mathematical equation (e.g., neural network based equation) to accurately adjust air flow of the ventilation device 1310 to meet a target air flow. It should be understood that this second embodiment ventilation device 1310 contains structures, features and/or functions that are similar to the structures, features and/or functions disclosed in connection with the first embodiment of the ventilation device 310. Accordingly, reference numbers that are separated by 1000 will be used in connection with this second embodiment to denote the structures and/or features that are similar to the structures and/or features disclosed in the first embodiment. Additionally, one of ordinary skill in the art shall understand that while the structures, features and/or functions are similar that does not mean the structures, features and/or functions are exactly the same. Further, it should be understood that structures and/or features of this second embodiment may be used in connection with any other embodiment contained within this application or its related applications.

Like the first embodiment of the ventilation device 310, the second embodiment of the ventilation device 1310 includes: (i) two PMSM motor 1385, 1390 and (ii) control circuitry 1340 that includes a neural network based mathematical equation 1500. Also, the second embodiment of the ventilation device 1310 also uses the mathematical equation 1500 to adjust the air flow rates of the motors 1385, 1390. Unlike the first embodiment of the ventilation device 310, the second embodiment of the ventilation device is range hood and the motors 1385, 1390 are designed to force air outside of the structure or building. Thus, the neural network estimators for the supply and the exhaust fans may be combine into a single neural network estimator 1456. In addition, the first calculator 1429, 1249a and flow controller 1433, 1433a can be combine. Accordingly, the control circuitry 1340 does not attempt to balance the air flow from air stream 1320 with the air flow from the other air stream 1350. Nevertheless, the control circuitry 1340 still utilizes the neural network based mathematical equation 1500 to accurately adjust the values supplied to the motors 1385, 1390 to achieve the desired user target air flow rate 1364.

Figure 21:
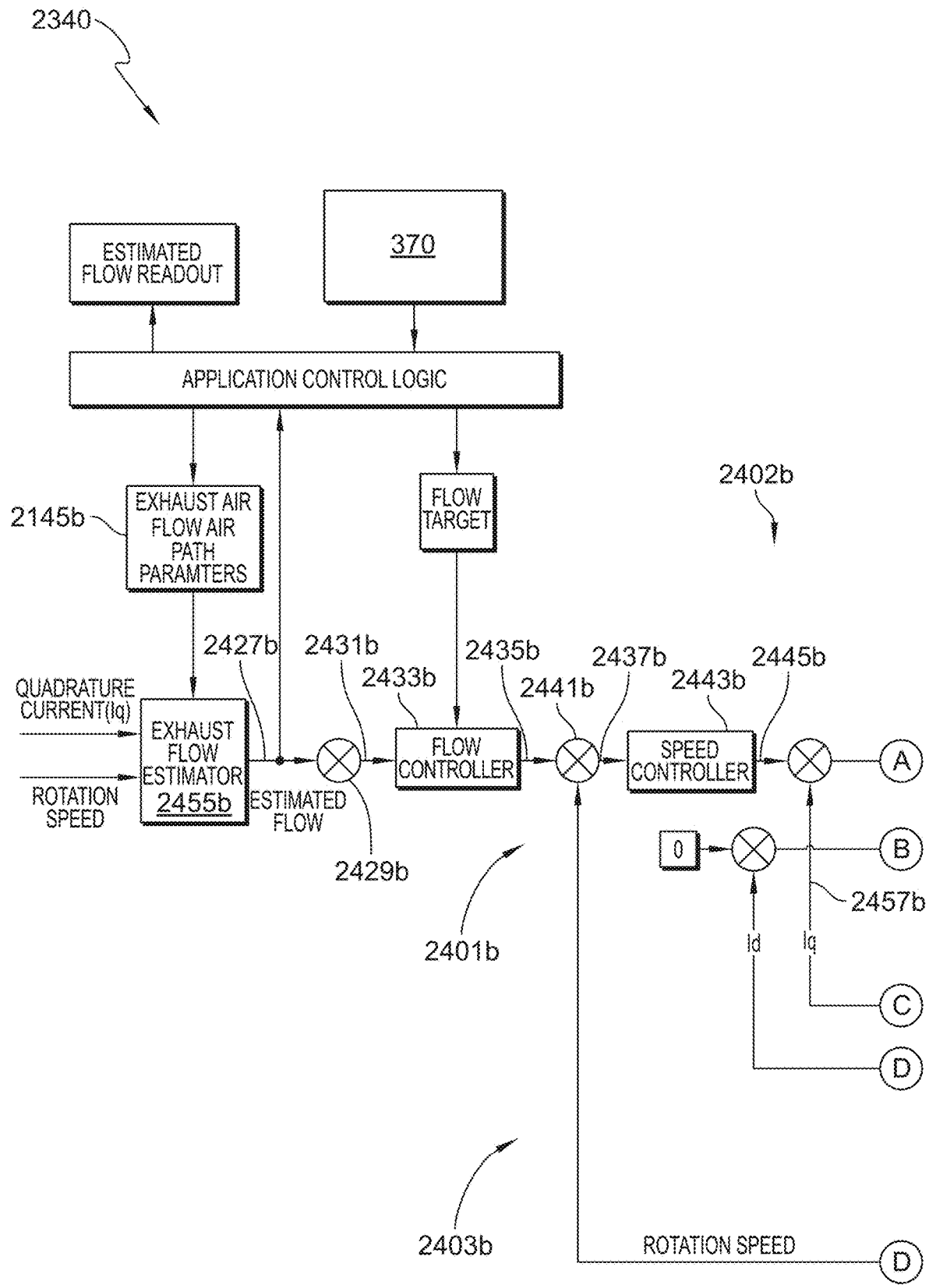
FIG. 21 is circuit diagrams of the control circuit for a third exemplary embodiment of an ventilation device according to the present disclosure.
Figure 21:
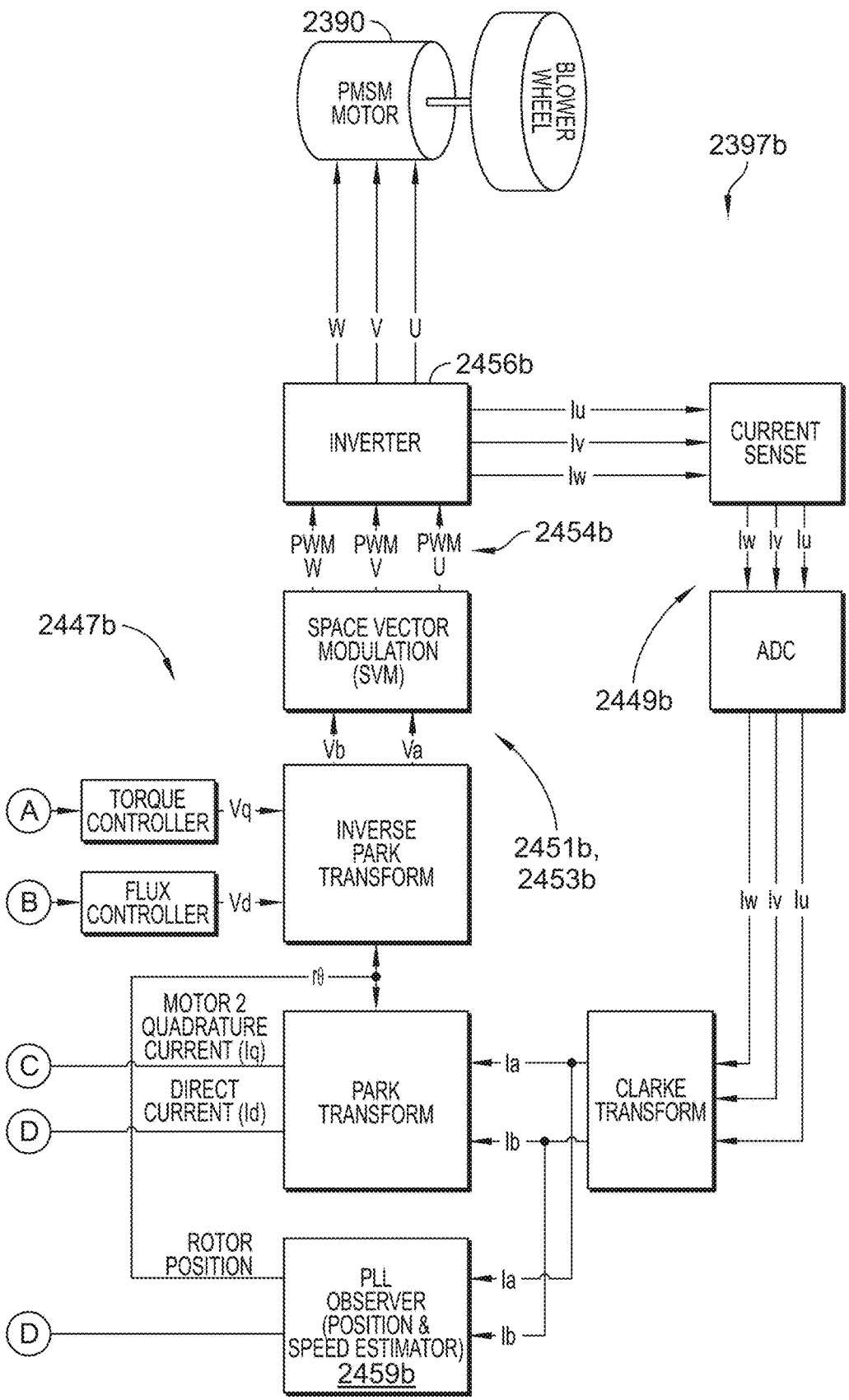

FIG. 21 describe a third embodiment of a ventilation device 2130 that utilizes a mathematical equation (e.g., neural network based equation) to accurately adjust air flow of the ventilation device to meet a target air flow. It should be understood that this third embodiment ventilation device 2310 contains structures, features and/or functions that are similar to the structures, features and/or functions disclosed in connection with the first embodiment of the ventilation device 310. Accordingly, reference numbers that are separated by 2000 will be used in connection with this second embodiment to denote the structures and/or features that are similar to the structures and/or features disclosed in the first embodiment. Additionally, one of ordinary skill in the art shall understand that while the structures, features and/or functions are similar that does not mean the structures, features and/or functions are exactly the same. Further, it should be understood that structures and/or features of this second embodiment may be used in connection with any other embodiment contained within this application or its related applications.

Like the first embodiment of the ventilation device 310, the third embodiment of the ventilation device 2310 includes control circuitry 1340 that includes a neural network based mathematical equation 2500. Also, the third embodiment of the ventilation device 2310 also uses the mathematical equation 2500 to adjust the air flow rate of a motor 2390. Unlike the first embodiment of the ventilation device 310, the third embodiment of the ventilation device 2310 is bathroom fan and only includes one motor 2390, which is designed to force air outside of the structure or building. The neural network estimator for the supply fans may be omitted. Accordingly, the control circuitry 2340 does not attempt to balance the air flow from air stream 2320 with the air flow from the other air stream 2350. Nevertheless, the control circuitry 2340 still utilizes the neural network based mathematical equation 2500 to accurately adjust the values supplied to the motor 2390 to achieve the desired air flow rate 2364. It should be understood that the ventilation device may also be supply ventilators, and different types of fan based products, such as liquid pumps.

INDUSTRIAL APPLICABILITY

The above disclosure may represent an improvement in the art because it describes an ventilation device 310 that automatically balances itself using mathematical equations. Additionally, the ventilation device 310 has the ability to rebalance itself in light of temperatures changes or other like factors. Further, the ventilation device 310 that can automatically balance itself within 10% error of being balanced also represents an improvement in the art. Accordingly, the ventilation device 310 will save the installer from performing all the STEPS described in FIG. 2A at various points, including installation and when the seasons change. In addition, the ventilation device 310 will meet various building codes (see Canada's National building codes). Further, the ventilation device 310 described herein is less expensive than other solutions because it does not use flow sensors contained within the core 325 of the ventilation device 310 to adjust the speed of the blowers 330, 360.

While some implementations have been illustrated and described, numerous modifications come to mind without significantly departing from the spirit of the disclosure, and the scope of protection is only limited by the scope of the accompanying claims. For example, the cross-sectional shape and cross-sectional area of the supply duct 122, supply ducting in the building 135, exhaust ducting in the building 155, and exhaust duct 160 as well as the material from which they are formed, can vary depending on the operating environment and the requirements of the system. For example, the ducting 122, 135, 155, 160 can be comprised of rigid and/or flexible materials as generally known in the art.

In some embodiments, the motor 385, 390 can be a brushless AC (BLAC) or brushless DC motor (BLDC). These types of motors are synchronous electric motors powered by either alternating current (AC) or direct current (DC) electricity and having an electronic commutation system, rather than a mechanical commutator and brushes, which results in improved motor efficiency and reduced mechanical wear, increasing the life of the motor. Current to torque and voltage to rpm are linear relationships in BLAC and BLDC motors. Brushless DC motors generally exhibit a reduced operating noise as compared to other types of motors suitable for driving a blower wheel or similar fan element. In addition to PMSM motors, BLDC motors provide reliable start-up and continual operation and controllability at very low speeds. In some embodiments, an interface can be provided to convert an AC power signal which would be used to control an AC induction motor to a usable input to control, PMSM, or BLDC motor. Of course, it should be understood by one of skill in the art that various embodiments of the invention can alternatively utilize other types of motors.

In some embodiments, the ventilation device 310 may be connected via a wire or wirelessly with other ventilation deices contained within the environment 305. These other ventilation devices may include range hoods, supply fans, bathroom fans, or etc. Connecting these devices to one another may provide benefits where the bathroom fan can accurately account for the volume of air that was removed from the environment 305 and a supply fan can be utilized to provide the volume of air that was removed. This will ensure that the environment 305 remains balanced. In another embodiment, the ventilation device 310 may be connected to an Indoor Air Quality controller, which may regulate when and how much air volume is moved into or removed from the environment 305. One example of an Indoor Air Quality controller is described within 62/789,501, which was filed on Jan. 7, 2019, which is hereby incorporated by reference herein for all purposes.

It should also be understood that other equation and other activation functions for the neural network may be used. An example of other activation equations that may be used are shown in the below table. To note, the neural network may use any combination of these activation equations. For example, a ReLU activation function may be used in combination with Softmax function.

| Name | Equation |
|---|---|
| Identity | $f(x) = x$ |
| Binary step | $f(x) = \begin{cases} 0 & \text{for } x < 0 \\ 1 & \text{for } x \geq 0 \end{cases}$ |
| Sigmoid | $f(x) = \sigma(x) = \dfrac{1}{1 + e^{-x}}$ |
| TanH | $f(x) = \tanh(x) = \dfrac{(e^x - e^{-x})}{(e^x + e^{-x})}$ |
| ArcTan | $f(x) = \tan^{-1}(x)$ |
| Softsign | $f(x) = \dfrac{x}{1 + |x|}$ |
| Inverse square root unit (ISRU) | $f(x) = \dfrac{x}{\sqrt{1 + \alpha x^2}}$ |
| Rectified linear unit (ReLU) | $f(x) = \begin{cases} 0 & \text{for } x < 0 \\ x & \text{for } x \geq 0 \end{cases}$ |
| Leaky rectified linear unit (Leaky ReLU) | $f(x) = \begin{cases} 0.01x & \text{for } x < 0 \\ x & \text{for } x \geq 0 \end{cases}$ |
| Parameteric rectified linear unit (PReLU) | $f(\alpha, x) = \begin{cases} \alpha x & \text{for } x < 0 \\ x & \text{for } x \geq 0 \end{cases}$ |
| Randomized leaky rectified linear unit (RReLU) | $f(\alpha, x) = \begin{cases} \alpha x & \text{for } x < 0 \\ x & \text{for } x \geq 0 \end{cases}$ |
| Exponential linear unit (ELU) | $f(\alpha, x) = \begin{cases} \alpha(e^x - 1) & \text{for } x < 0 \\ x & \text{for } x \geq 0 \end{cases}$ |
| Scaled exponential linear unit (SELU) | $f(\alpha, x) = \lambda \begin{cases} \alpha(e^x - 1) & \text{for } x < 0 \\ x & \text{for } x \geq 0 \end{cases}$ with $\lambda = 1.0507$ and $\alpha = 1.67326$ |
| S-shaped rectified linear activation unit (SReLU) | $f_{t_l, a_l, t_r, a_r}(x) = \begin{cases} t_l + a_l(x - t_l) & \text{for } x \leq t_l \\ x & \text{for } t_l < x < t_r \\ t_r + a_r(x - t_r) & \text{for } x \geq t_r \end{cases}$ $t_l, a_l, t_r, a_r$ are parameters. |
| Inverse square root linear unit (ISRLU) | $f(x) = \begin{cases} \dfrac{x}{\sqrt{1 + \alpha x^2}} & \text{for } x < 0 \\ x & \text{for } x \geq 0 \end{cases}$ |
| Adaptive piecewise linear (APL) | $f(x) = \max(0, x) + \sum_{s=1}^{S} a_i^s \max(0, -x + b_i^s)$ |
| SoftPlus | $f(x) = \ln(1 + e^x)$ |
| Bent identity | $f(x) = \dfrac{\sqrt{x^2 + 1} - 1}{2} + x$ |
| Sigmoid-weighted linear unit (SiLU) | $f(x) = x \cdot \sigma(x)$ |
| SoftExponential | $f(\alpha, x) = \begin{cases} -\dfrac{\ln(1 - \alpha(x + \alpha))}{\alpha} & \text{for } \alpha < 0 \\ x & \text{for } \alpha = 0 \\ \dfrac{e^{\alpha x} - 1}{\alpha} + \alpha & \text{for } \alpha > 0 \end{cases}$ |
| Sinusoid | $f(x) = \sin(x)$ |
| Sinc | $f(x) = \begin{cases} 1 & \text{for } x = 0 \\ \dfrac{\sin(x)}{x} & \text{for } x \neq 0 \end{cases}$ |
| Gaussian | $f(x) = e^{-x^2}$ |
| Softmax | $f_i(\vec{x}) = \dfrac{e^{x_i}}{\sum_{j=1}^{J} e^{x_j}}$ for $i = 1, \ldots, J$ |
| Maxout | $f(\vec{x}) = \max_i x_i$ |

Headings and subheadings, if any, are used for convenience only and are not limiting. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A ventilation device comprising:
   a blower assembly having a blower motor and a control circuit, said control circuit programmed with a mathematical equation;
   wherein the control circuit is capable of replacing the mathematical equation with an updated mathematical equation received from a remote location; and
   wherein the updated mathematical equation is configured to determine an estimated blower air flow for the blower assembly based upon the following inputs: (i) parameters that are derived from the use of a neural network, (ii) a blower motor speed of the blower motor, and (iii) a blower motor current of the blower motor.

2. The ventilation device of claim 1, wherein the estimated blower air flow is within 5% of an air flow rate generated by the blower motor.

3. The ventilation device of claim 1, wherein the ventilation device is selected from a group of ventilation devices consisting of: (i) heat recovery ventilator, (ii) energy recovery ventilator, (iii) range hood, (iv) bathroom exhaust fan, and (v) supply fan.

4. The ventilation device of claim 1, further comprising a damper operably associated with the blower assembly, the damper having a plurality of positional settings; and
   wherein the updated mathematical equation is further configured to utilize the positional setting of the damper in determining the estimated blower air flow for the blower assembly.

5. The ventilation device of claim 1, wherein the control circuit further includes a current limit for the blower motor; and
   wherein a warning is provided to a user when an air flow set point is set to a value that requires current supplied to the blower motor to be greater than the current limit.

6. The ventilation device of claim 1, wherein when the estimated blower air flow is different than an air flow set point, the control circuit is configured to selectively alter current supplied to the blower motor in order equate the estimated blower air flow equal and the air flow set point.

7. The ventilation device of claim 6, wherein the ventilation device is installed in an operating environment, and the control circuit is configured to modify the air flow set point A based upon information received about a volume of air added or removed from the operating environment.

8. The ventilation device of claim 6, wherein the control circuit is configured to modify the air flow set point based upon the information received from an indoor air quality controller.

9. The ventilation device of claim 1, wherein the blower assembly is an exhaust blower assembly, the blower motor is an exhaust blower motor, the control circuit is an exhaust control circuit, the parameters of the blower motor are exhaust air path parameters, and the estimated blower air flow is an estimated exhaust blower air flow; and
   wherein the ventilation device further includes:
      a supply blower assembly having a supply blower motor and a supply control circuit, said supply control circuit is programmed with a supply mathematical equation, and
      wherein the supply mathematical equation determines an estimated supply blower air flow for the supply blower assembly based upon the following inputs: (i) supply air path parameters derived from the use of a supply neural network, (ii) a supply blower motor speed of the supply blower motor, and (ii) a supply blower motor current of the supply blower motor.

10. A ventilation device configured to generate an air flow and comprising:
    a blower assembly having a blower motor and a control circuit, wherein said control circuit is programmed with a mathematical equation;
    wherein the ventilation device is capable of receiving an updated mathematical equation derived from the use of a neural network; and
    wherein the control circuit is capable of replacing the mathematical equation with the updated mathematical equation.

11. The ventilation device of claim 10, wherein the updated mathematical equation includes a plurality of parameters that are outputs of the neural network, and wherein said neural network was trained using measurements recorded at various operating points of the blower assembly.

12. The ventilation device of claim 10, wherein the updated mathematical equation is configured to determine an estimated blower air flow for the blower assembly.

13. The ventilation device of claim 12, wherein when the estimated blower air flow is different than an air flow set point, the control circuit is configured to selectively alter power supplied to the blower motor in order to equate the estimated blower air flow equal and the air flow set point.

14. The ventilation device of claim 13, wherein the ventilation device is installed in an operating environment, and the control circuit is configured to modify the air flow set point based upon information received about a volume of air added or removed from the operating environment.

15. The ventilation device of claim 13, wherein the control circuit is configured to modify the air flow set point based upon information received from an indoor air quality controller.

16. The ventilation device of claim 12, wherein the estimated blower air flow is within 5% of an air flow rate generated by the blower motor.

17. A method of estimating air flow of a ventilation device using a control circuit of the ventilation device, the method comprises:
    uploading an original mathematical equation to the control circuit of the ventilation device;
    generating an updated mathematical equation using a neural network;
    transmitting the updated mathematical equation to the control circuit of the ventilation device;
    replacing the original mathematical equation with the updated mathematical equation; and
    calculateing an estimated air flow of a blower assembly of the ventilation device using the updated mathematical equation.

18. The method of claim 17, wherein the neural network was trained using measurements recorded at various operating points of the blower assembly.

19. The method of claim 17, further comprising the step of modifying power supplied to a blower motor of the blower assembly in order to equate the estimated air flow and an air flow set point.

20. The method of claim 17, wherein the blower assembly is installed in an operating environment; and
    further comprising the step of modifying an air flow set point of the blower assembly based upon information received about a volume of air added or removed from the operating environment.

21. The method of claim 17, further comprising the step of modifying an air flow set point of the blower assembly based upon information received from an indoor air quality controller.

22. The method of claim 17, wherein the estimated air flow is within 5% of an air flow rate generated by the blower assembly.

\* \* \* \* \*